US012569879B2

(12) United States Patent
Roehr et al.

(10) Patent No.: US 12,569,879 B2
(45) Date of Patent: Mar. 10, 2026

(54) PROCESS FOR PRODUCING A MULTILAYER COATING COMPRISING A SPARKLING COAT LAYER AND MULTILAYER COATING OBTAINED FROM SAID PROCESS

(71) Applicant: BASF Coatings GmbH, Münster (DE)

(72) Inventors: Elke Roehr, Würzburg (DE); Kerstin Reder, Würzburg (DE); Berthold Deppisch, Würzburg (DE)

(73) Assignee: BASF COATINGS GMBH, Muenster (DE)

( * ) Notice: Subject to any disclaimer, the term of this patent is extended or adjusted under 35 U.S.C. 154(b) by 953 days.

(21) Appl. No.: 17/629,553

(22) PCT Filed: Jul. 23, 2020

(86) PCT No.: PCT/EP2020/070843

§ 371 (c)(1),
(2) Date: Jan. 24, 2022

(87) PCT Pub. No.: WO2021/018735

PCT Pub. Date: Feb. 4, 2021

(65) Prior Publication Data

US 2022/0266297 A1 Aug. 25, 2022

(30) Foreign Application Priority Data

Jul. 29, 2019 (EP) .................................... 19188842

(51) Int. Cl.
*B05D 5/06* (2006.01)
*B05D 7/00* (2006.01)

(52) U.S. Cl.
CPC ............... *B05D 7/572* (2013.01); *B05D 5/06* (2013.01); *B05D 2202/10* (2013.01); *B05D 2451/00* (2013.01); *B05D 2503/00* (2013.01); *B05D 2601/22* (2013.01)

(58) Field of Classification Search
CPC ................................. B05D 7/572; B05D 5/06
See application file for complete search history.

(56) References Cited

U.S. PATENT DOCUMENTS 4,914,148 A 4/1990 Hille et al.
5,334,420 A 8/1994 Hartung et al.
5,368,885 A 11/1994 Fotiuo
5,368,944 A 11/1994 Hartung et al.
5,589,049 A 12/1996 Ott et al.
6,001,915 A 12/1999 Schwarte et al.
6,274,649 B1 8/2001 Ott et al.
6,632,915 B1 10/2003 Schwarte et al.
6,737,468 B1 5/2004 Bremser
6,951,602 B1 10/2005 Reuter et al.
8,211,504 B2 7/2012 Wegner et al.
9,090,732 B2 7/2015 Poppe et al.
2005/0240042 A1 10/2005 Hartung et al.
2006/0223910 A1* 10/2006 Bagala, Sr. .............. A61Q 1/02 106/482
2008/0220173 A1 9/2008 Poppe et al.
2008/0279796 A1* 11/2008 Handrosch ............ C09C 1/0039 106/419
2010/0015344 A1 1/2010 Groenewolt et al.
2011/0268964 A1* 11/2011 Dornbusch .......... C09D 175/04 977/932
2012/0100394 A1 4/2012 Richert et al.
2012/0282311 A1* 11/2012 Schmid ................. C09C 1/0024 501/153
2014/0255608 A1 9/2014 Eibon et al.
2016/0200922 A1 7/2016 Sugamoto et al.
2016/0326665 A1* 11/2016 Steinmetz ............. C25D 13/22

FOREIGN PATENT DOCUMENTS

DE 4009858 A1 10/1991
DE 4437535 A1 4/1996
DE 19930665 A1 1/2001
DE 19948004 A1 7/2001
DE 10043405 C1 6/2002
EP 0228003 A1 7/1987
EP 0394737 B1 2/1994
EP 0787159 B1 12/1998
EP 3075791 A1 10/2016
JP H02160079 A 6/1990
JP 200116221 A 6/2001
JP 2004081971 A 3/2004
WO 1991015528 A1 10/1991
WO 1992015405 A1 9/1992
WO 1993016139 A1 8/1993
WO 1998033835 A1 8/1998
WO 2001002498 A1 1/2001
WO 2004018580 A1 3/2004
WO 2006042585 A1 4/2006
WO 2006056866 A1 6/2006
WO 2008074490 A1 6/2008
WO 2009077182 A1 6/2009

OTHER PUBLICATIONS

International Search Report and Written Opinion for corresponding PCT/EP2020/070843, mailed Nov. 11, 2020, 12 Pages.

(Continued)

*Primary Examiner* — Dah-Wei D. Yuan
*Assistant Examiner* — Kristen A Dagenais
(74) *Attorney, Agent, or Firm* — Armstrong Teasdale LLP

(57) ABSTRACT

Described herein is a process for producing a multilayer coating (MC) on a substrate (S), the process including producing at least one basecoat layer, optionally at least one clearcoat layer, at least one layer including a mixture of glass flakes and at least one further clearcoat layer and jointly curing all applied layers. Also described herein is a multilayer coating obtained by the described process.

21 Claims, No Drawings

(56) References Cited

OTHER PUBLICATIONS

European Search Report for EP Patent Application No. 19188842.9, Issued on Feb. 5, 2020, 3 pages.

Hermann Römpp, "Römpp Lexikon, Lacke und Druckfarben", 1998, p. 176 and 451.

Krüger, et al., "Hydroxylzahlbestimmung an Polyetheralkoholen unter 4-Dimethylaminopyridin-Katalyse", Plaste und Kautschuk, vol. 5, 1982, p. 274.

* cited by examiner

PROCESS FOR PRODUCING A MULTILAYER COATING COMPRISING A SPARKLING COAT LAYER AND MULTILAYER COATING OBTAINED FROM SAID PROCESS

CROSS-REFERENCE TO RELATED APPLICATIONS

This application is a U.S. National Phase Application of International Patent Application No. PCT/EP2020/070843, filed Jul. 23, 2020, which claims priority to European Patent Application Ser. No. 19/188,842.9, filed Jul. 29, 2019, the entire contents of which are hereby incorporated by reference herein.

The present invention relates to a process for producing a multilayer coating (MC) on a substrate (S), the process comprising the production of at least one basecoat layer, optionally at least one clearcoat layer, at least one sparkling coat layer comprising a mixture of glass flakes and at least one further clearcoat layer and joint curing of all applied layers. Moreover, the present invention relates to a multilayer coating obtained by the inventive process.

STATE OF THE ART

Generally, coatings in the automobile sector comprise several layers and can thus be regarded as multilayer coatings. Starting from the metallic substrate, multicoat paint systems of this kind generally comprise a separately cured electrocoat film, a film which is applied directly to the electrocoat film and is cured separately, usually referred to as primer, at least one film layer which comprises color pigments and/or effect pigments and is generally referred to as basecoat film, and a clearcoat film.

The fundamental compositions and functions of the stated coats, and of the coating materials necessary for the construction of these coats—i.e. electrocoat materials, primers, basecoat materials comprising color and/or effect pigments and clearcoat materials—are known. Thus, for example, the fundamental purpose of the electrophoretically applied electrocoat is to protect the substrate from corrosion. The primary function of the primer coat is to provide protection from mechanical exposure such as stone chipping and to fill out irregularities in the substrate. The basecoat is primarily responsible for producing esthetic qualities such as color and/or effects such as flock, while the clearcoat that then follows serves in particular to provide the multicoat paint system with scratch resistance and gloss.

Producing these multicoat paint systems generally involves electrophoretically depositing or applying an electrocoat material, more particularly a cathodic electrocoat material, on the metallic substrate, such as an automobile body. The metallic substrate may undergo various pretreatments prior to the deposition of the electrocoat material—for example, known conversion coatings such as phosphate coatings, more particularly zinc phosphate coats, may be applied. The operation of depositing the electrocoat material takes place in general in corresponding electrocoating tanks. Following application of the electrocoat material, the coated substrate is removed from the tank and is optionally rinsed and subjected to flashing and/or interim drying, and lastly the applied electrocoat material is cured. Film thickness of the cured coating should be approximately 15 to 25 micrometers.

The primer material is then applied directly to the cured electrocoat, optionally subjected to flashing and/or interim drying, and is thereafter cured. Applied directly to the cured primer coat is a basecoat material comprising color and/or effect pigments and optionally subjected to flashing and/or interim drying. This basecoat film thus produced is then coated with a clearcoat material without separate curing. The clearcoat film can be subjected to flashing and/or interim drying before the basecoat film and any clearcoat film that has likewise been beforehand are jointly cured (so-called 2 coat 1 bake (2C1B) method).

Particularly in connection with metal substrates, there are approaches to omit the separate step of curing the coating composition applied directly to the cured electrocoat film (that is, the coating composition referred to as primer within the standard method described above), and at the same time, optionally, to lower the film thickness of the coating film produced from this coating composition (so-called 3 coat 1 bake (3C1B) method). In this method, the coating film which is not separately cured is then frequently called basecoat film (and no longer primer film) or, to distinguish it from a second basecoat film applied atop, it is called the first basecoat film. In some cases, there are attempts to even omit this basecoat/first basecoat film (in this case merely one basecoat film is produced directly on the electrocoat film, over which, without a separate curing step, a clearcoat material is applied).

Since many years there is a growing interest in the automotive field for multilayer coatings having a brilliant appearance and a high degree of luster and sparkle. To achieve such multilayer coatings a wide variety of effect pigments is used. Effect pigments range from metal flake pigments like aluminum-based pigments over mica and pearlescent pigments to glass flake pigments.

In principle, the higher the amount of the effect pigment in the respective coating layer, the higher is the degree of sparkle achieved in the final multilayer coating. There is, however, a limit of the degree of sparkle and luster that can be achieved because the amount of effect pigment that can be included in the coating composition is generally limited at least by the factors of large-scale industrial applicability, price and storage stability of the coating composition.

The effect pigments can in principle be included in the basecoat or the clearcoat layer of the multilayer coating. An example of incorporating glass flake pigments in powder clear coating compositions is described in U.S. Pat. No. 5,368,885 A. However, the pigmented clear coats have not found their way into being used in the industry which can be explained, for instance, by problems of their application to the car bodies with the standard application technics used in high volume production or in some other factors like a short shelf life or problems in their adhesion to the underlying base coat layers.

Another example, where glass flake pigments are incorporated in a liquid clear coating compositions is disclosed in EP 3 075 791 A1. These clear coating compositions are the used as a top coat in multilayer coatings. According to this document, the inclusion of glass flakes in the top layer of the multilayer coatings leads to increased luster and sparkle compared to the use of glass flakes in basecoat layers.

Another approach for achieving a high sparkle effect is described in JP 2004081971 A and in JP 2001162219 A. Both documents provide a method for forming a brilliant coating film capable of developing a three-dimensional glittering luminance feeling having interfering action. According to JP 2001162219 A, there is provided a multilayer coating comprising a brilliant base coating layer, a brilliant clear coating layer containing a metal oxide coated glass flake pigment on top of the base coating layer and a clear coating layer on top of the brilliant clear coating layer. JP 2004081971 A discloses a multilayer coating comprising a color base coating layer with an L value of 1 to 40, a brilliant base coating layer containing 0.001 to 5 mass-% metal covered glass flake pigment on top of the base coating layer and a clear coating layer on top of the brilliant clear coating layer.

Although the known multilayer coatings containing layers comprising glass flakes as effect pigments have numerous beneficial properties, there is still a need to provide multilayer coatings having a brilliant appearance and a high degree of luster and sparkle as well as good mechanical properties, such as intercoat adhesion or the stonechip resistance.

OBJECT

Therefore, an object of the present invention is to provide a process for producing a multilayer coating (MC) on a substrate (S), wherein the obtained multilayer coating (MC) has an outstanding degree of sparkle and luster as well as good mechanical properties, especially good adhesion to the substrate and good intercoat adhesion. Moreover, the process should be suitable for use in the automotive industry in combination with standard application methods and application gear. Preferably, the process should be used in connection with already existing basecoat compositions to increase the color tone variants.

TECHNICAL SOLUTION

It has been found that the stated objects can be achieved by a process for producing a multilayer coating (MC) on a substrate (S), the process comprising:

(1) optionally applying a composition (Z1) to the substrate (S) and subsequent curing of the composition (Z1) to form a cured first coating layer (S1) on the substrate (S);

(2) applying, directly to the cured first coating layer (S1) or the substrate (S),
  (a) an aqueous basecoat composition (bL2a) to form a basecoat layer (BL2a) or
  (b) at least two aqueous basecoat compositions (bL2-a) and (bL2-z) in direct sequence to form at least two basecoat layers (BL2-a) and (BL2-z) directly upon each other;

(3) optionally, applying a clearcoat composition (c1) directly to the basecoat layer (BL2a) or the top basecoat layer (BL2-z) to form a clearcoat layer (C1) and jointly curing the basecoat layer (BL2a) or the at least two basecoat layers (BL2-a) and (BL2-z) and the clearcoat layer (C1), (4) applying a composition (Z2) directly to the basecoat layer (BL2a) or the uppermost basecoat layer (BL2-z) or the clearcoat layer (C1) to form a coating layer (L3)

(5) applying a clearcoat composition (c2) directly to the coating layer (L3) to form a clearcoat layer (C2), (6) jointly curing
  (a) the basecoat layer (BL2a) or the at least two basecoat layers (BL2-a) and (BL2-z), optionally the clearcoat layer (C1), the coating layer (L3) and the clearcoat layer (C2), or
  (b) the coating layer (L3) and the clearcoat layer (02);

characterized in that the composition (Z2) comprises:

(i) at least one binder B, (ii) at least one solvent L, (iii) at least one platelet glass flake pigment GF1 having an average particle size $D_{90}$ of 30 to 54 μm, measured by means of laser diffraction according to DIN EN ISO 13320:2009-10, and (iv) at least one platelet glass flake pigment GF2 having an average particle size $D_{90}$ of 55 to 80 μm, measured by means of laser diffraction according to DIN EN ISO 13320:2009-10

The process stated above is also referred to below as process of the invention, and accordingly is a subject of the present invention. Preferred embodiments of the process of the invention can be found in the description later on below and also in the dependent claims.

A further subject of the present invention is a multilayer coating (MC) produced using the process of the invention.

The process of the invention allows to produce multilayer coatings (MC) possessing an outstanding degree of sparkle and luster as well as good mechanical properties, especially good adhesion to the substrate and good intercoat adhesion. Moreover, the process can be implemented in the coating of car bodies performed in the automotive industry without changing the standard application methods, the standard application gear, the sequence of standard steps performed in 2016 or 3016 processes or the basecoat and clearcoat compositions used in these processes. Thus, the existing serial colors can be multiplicated by using the inventive process without changing the coating process currently performed in the automotive industry.

DETAILED DESCRIPTION

First of all, a number of terms used in the context of the present invention will be explained.

A "binder" in the context of the present invention and in accordance with relevant DIN EN ISO 4618 is the nonvolatile component of a coating composition, without pigments and fillers. The nonvolatile component can be determined as described in the experimental section.

The term "(meth)acrylate" shall refer hereinafter both to acrylate and to methacrylate.

All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

The application of a coating composition to a substrate, or the production of a coating film on a substrate, are understood as follows: the respective coating composition is applied in such a way that the coating film produced therefrom is arranged on the substrate but need not necessarily be in direct contact with the substrate. Thus, other layers can be present between the coating film and the substrate. For example, in optional step (1), a cured coating layer (S1) is produced on the metallic substrate (S), but a conversion coating as described below, such as a zinc phosphate coating, may be arranged between the substrate and the cured coating layer (S1).

In contrast, the application of a coating composition directly to a substrate, or the production of a coating film directly on a substrate, results in a direct contact of the produced coating film and the substrate. Thus, more particularly, no other layer is present between the coating film and the substrate. Of course, the same principle applies to directly successive application of coating compositions or the production of directly successive coating films, for example in step (2)(b) of the present invention.

The term “flashing off” denotes the vaporization of organic solvents and/or water present in a coating composition after application, usually at ambient temperature (i.e. room temperature), for example 15 to 35° C. for a period of, for example, 0.5 to 30 minutes. Since the coating composition is still free-flowing at least directly after the application in droplet form, it can form a homogeneous, smooth coating film by running. After the flash-off operation, the coating film, however, is still not in a state ready for use. For example, it is no longer free-flowing, but is still soft and/or tacky, and in some cases only partly dried. More particularly, the coating film still has not cured as described below.

In contrast, intermediate drying takes place at, for example, higher temperatures and/or for a longer period, such that, in comparison to the flash-off, a higher proportion of organic solvents and/or water evaporates from the applied coating film. Thus, intermediate drying is usually performed at a temperature elevated relative to ambient temperature, for example of 40 to 90° C., for a period of, for example, 1 to 60 minutes. However, the intermediate drying does not give a coating film in a state ready for use either, i.e. a cured coating film as described below. A typical sequence of flash-off and intermediate drying operations would involve, for example, flashing off the applied coating film at ambient temperature for 5 minutes and then intermediately drying it at 80° C. for 10 minutes.

Accordingly, curing of a coating film is understood to mean the conversion of such a film to the ready-to-use state, i.e. to a state in which the substrate provided with the respective coating film can be transported, stored and used as intended. More particularly, a cured coating film is no longer soft or tacky, but has been conditioned as a solid coating film which does not undergo any further significant change in its properties, such as hardness or adhesion on the substrate, even under further exposure to curing conditions as described below.

In the context of the present invention, “physically curable” or the term “physical curing” means the formation of a cured coating film through release of solvent from polymer solutions or polymer dispersions, the curing being achieved through interlooping of polymer chains.

In the context of the present invention, “thermochemically curable” or the term “thermochemical curing” means the crosslinking, initiated by chemical reaction of reactive functional groups, of a paint film (formation of a cured coating film), it being possible to provide the activation energy for these chemical reactions through thermal energy. This can involve reaction of different, mutually complementary functional groups with one another (complementary functional groups) and/or formation of the cured layer based on the reaction of autoreactive groups, i.e. functional groups which inter-react with groups of the same kind. Examples of suitable complementary reactive functional groups and autoreactive functional groups are known, for example, from German patent application DE 199 30 665 A1, page 7 line 28 to page 9 line 24.

This crosslinking may be self-crosslinking and/or external crosslinking. If, for example, the complementary reactive functional groups are already present in an organic polymer used as a binder, for example a polyester, a polyurethane or a poly(meth)acrylate, self-crosslinking is present. External crosslinking is present, for example, when a (first) organic polymer containing particular functional groups, for example hydroxyl groups, reacts with a crosslinking agent known per se, for example a polyisocyanate and/or a melamine resin. The crosslinking agent thus contains reactive functional groups complementary to the reactive functional groups present in the (first) organic polymer used as the binder.

Especially in the case of external crosslinking, the one-component and multicomponent systems, especially two-component systems, known per se are useful. In one-component systems, the components to be crosslinked, for example organic polymers as binders and crosslinking agents, are present alongside one another, i.e. in one component. A prerequisite for this is that the components to be crosslinked react with one another, i.e. enter into curing reactions, only at relatively high temperatures of, for example, above 100° C. Otherwise, the components to be crosslinked would have to be stored separately from one another and only be mixed with one another shortly before application to a substrate, in order to avoid premature, at least partial thermochemical curing (cf. two-component systems). An example of a combination is that of hydroxy-functional polyesters and/or polyurethanes with melamine resins and/or blocked polyisocyanates as crosslinking agents. In two-component systems, the components to be crosslinked, for example the organic polymers as binders and the crosslinking agents, are present separately in at least two components which are combined only shortly prior to application. This form is chosen when the components to be crosslinked react with one another even at ambient temperatures or slightly elevated temperatures of, for example, 40 to 90° C. An example of a combination is that of hydroxy-functional polyesters and/or polyurethanes and/or poly(meth)acrylates with free polyisocyanates as crosslinking agents.

In the context of the present invention, “actinochemically curable” or the term “actinochemical curing” is understood to mean the fact that curing is possible using actinic radiation, namely electromagnetic radiation such as near infrared (NIR) and UV radiation, especially UV radiation, and corpuscular radiation such as electron beams for curing. Curing by UV radiation is commonly initiated by radical or cationic photoinitiators. Typical actinically curable functional groups are carbon-carbon double bonds, for which generally free-radical photoinitiators are used. Actinic curing is thus likewise based on chemical crosslinking.

In the case of a purely physically curing coating composition, curing is performed preferably between 15 and 90° C. over a period of 2 to 48 hours. In this case, curing may thus differ from the flash-off and/or intermediate drying operation merely by the duration of the curing step.

In principle, and within the context of the present invention, the curing of thermochemically curable, especially preferably thermochemically curable and externally crosslinking, one-component systems is performed preferably at temperatures of 80 to 250° C., more preferably 80 to 180° C., for a period of 5 to 60 minutes, preferably 10 to 45 minutes. Accordingly, any flash-off and/or intermediate drying phase which precedes the curing is performed at lower temperatures and/or for shorter periods.

In principle, and within the context of the present invention, the curing of thermochemically curable, especially preferably thermochemically curable and externally crosslinking, two-component systems is performed at temperatures of, for example, 15 to 90° C., preferably 40 to 90° C., for a period of 5 to 80 minutes, preferably 10 to 50 minutes. This of course does not rule out curing of a two-component system at higher temperatures. If, for example, both one-component and two-component systems are present within the films formed according to the inventive process, the joint curing is guided by the curing conditions needed for the one-component system, thus resulting in the use of higher curing temperatures as described for one-component systems. Accordingly, any flash-off and/or intermediate drying phase which precedes the curing is performed at lower temperatures and/or for shorter periods.

All the temperatures exemplified in the context of the present invention are understood as the temperature of the room in which the coated substrate is present. What is thus not meant is that the substrate itself must have the particular temperature.

If reference is made in the context of the present invention to an official standard, this of course means the version of the standard that was current on the filing date, or, if no current version exists at that date, then the last current version.

Inventive Process:

In the process of the invention, a multilayer coating (MC) is formed on a substrate (S).

The substrate (S) is preferably selected from metallic substrates, metallic substrates coated with a cured electrocoat, plastic substrates, reinforced plastic substrates and substrates comprising metallic and plastic components, especially preferably from metallic substrates coated with a cured electrocoat and/or reinforced plastic substrates.

In this respect, preferred metallic substrates (S) are selected from iron, aluminum, copper, zinc, magnesium and alloys thereof as well as steel. Preferred substrates are those of iron and steel, examples being typical iron and steel substrates as used in the automobile industry sector. The substrates themselves may be of whatever shape—that is, they may be, for example, simple metal panels or else complex components such as, in particular, automobile bodies and parts thereof.

Preferred plastic substrates (S) are basically substrates comprising or consisting of (i) polar plastics, such as polycarbonate, polyamide, polystyrene, styrene copolymers, polyesters, polyphenylene oxides and blends of these plastics, (ii) synthetic resins such as polyurethane RIM, SMC, BMC and (iii) polyolefine substrates of the polyethylene and polypropylene type with a high rubber content, such as PP-EPDM, and surface-activated polyolefin substrates. The plastics may furthermore be fiber-reinforced, in particular using carbon fibers and/or metal fibers.

The substrates (S) may be pretreated before step (1) of the inventive process or before applying the composition (Z1) in any conventional way—that is, for example, cleaned and/or provided with known conversion coatings or surface activating pre-treatments. Cleaning may be accomplished mechanically, for example, by means of wiping, sanding and/or polishing, and/or chemically by means of pickling methods, by incipient etching in acid or alkali baths, by means of hydrochloric or sulfuric acid, for example. Cleaning with organic solvents or aqueous cleaners is of course also possible. Pretreatment may likewise take place by application of conversion coatings, more particularly by means of phosphating and/or chromating, preferably phosphating. Surface activating pre-treatments are for example flame treatment, plasma treatment and corona discharge coming.

Step (1):

In optional step (1) of the inventive process, a cured first coating layer (S1) is produced on the substrate (S) by application of a composition (Z1) to the substrate (S) and subsequent curing of the composition (Z1). This step is preferably performed if the substrate (S) is a metallic substrate.

The composition (Z1) is preferably a cathodic or anodic electrocoat material, more preferably a cathodic electrocoat material. Electrocoat materials are aqueous coating compositions comprising anionic or cationic polymers as binders and generally typical anticorrosion pigments. The cathodic electrocoat materials preferred in the context of the invention comprise cationic polymers as binders, especially hydroxy-functional polyether amines, which preferably have aromatic structural units. Such polymers are generally obtained by reaction of appropriate bisphenol-based epoxy resins with amines, for example mono- and dialkylamines, alkanolamines and/or dialkylaminoalkylamines. These polymers are especially used in combination with blocked polyisocyanates known per se. Reference is made by way of example to the electrocoat materials described in WO 9833835 A1, WO 9316139 A1, WO 0102498 A1 and WO 2004018580 A1.

The composition (Z1) is preferably a one-component electrocoat material, comprising a hydroxy-functional epoxy resin as binder and a fully blocked polyisocyanate as crosslinking agent. The epoxy resin is preferably cathodic, and especially contains amino groups. The application proceeds by electrophoresis known in the state of the art. This means that the metallic substrate to be coated is first dipped into a dip bath containing the composition (Z1) and an electrical DC field is applied between the metallic substrate functioning as electrode and a counterelectrode. The non-volatile constituents of the composition (Z1) migrate, because of the charged binders, through the electrical field to the substrate and are deposited on the substrate, forming an electrocoat film. For example, in the case of a cathodic composition (Z1), the substrate is connected as the cathode leading to a deposition of the cationic binder neutralized by hydroxide ions formed at the cationic electrode by electrolysis of water. After the electrolytic application of the composition (Z1), the coated substrate (S) is removed from the bath, optionally rinsed off with, then optionally flashed off and/or intermediately dried, and finally cured. The composition (Z1) applied (or the as yet uncured composition (Z1) applied) is flashed off, for example, at 15 to 35° C. for a period of, for example, 0.5 to 30 minutes and/or intermediately dried at a temperature of preferably 40 to 90° C. for a period of, for example, 1 to 60 minutes. The composition (Z1) applied to the substrate (or the as yet uncured composition applied) is preferably cured at temperatures of 100 to 250° C., preferably 140 to 220° C. for a period of 5 to 60 minutes, preferably 10 to 45 minutes, which produces the cured first coating layer (S1).

The layer thickness of the cured composition (Z1) is, for example, to 40 μm, preferably 15 to 25 μm.

Step (2):

Step (2) of the inventive process either comprises production of exactly one basecoat layer (BL2a) (step (2)(a)) or production of at least two directly successive basecoat layers (BL2-a) and (BL2-z) (step (2)(b)). The layers are produced by (a) applying an aqueous basecoat composition (BL2a) directly to the substrate (S) or the cured first coating layer (S1) or (b) directly successively applying at least two basecoat compositions (BL2-a) and (BL2-z) to the substrate (S) or the cured first coating layer (S1).

The directly successive application of at least two, i.e. a plurality of, basecoat compositions to the to the substrate (S) or the cured first coating layer (S1) is thus understood to mean that a first basecoat composition (BL2-a) is applied directly to the substrate (S) or the cured first coating layer (S1) and then a second basecoat composition (BL2-b) is applied directly to the layer of the first basecoat composition. Any third basecoat composition (BL2-c) is then applied directly to the layer of the second basecoat composition. This operation can then be repeated analogously for further basecoat compositions (i.e. a fourth, fifth, etc. basecoat composition). The uppermost basecoat layer obtained after step (2)(b) of the inventive method is denoted as basecoat layer (BL2-z).

The basecoat layer (BL2a) or the first basecoat layer (BL2-a) is thus arranged directly on the substrate (S) or the cured first coating layer (S1).

A preferred embodiment of step (2) of the inventive process is the application of exactly one basecoat composition (bL2-a) to produce exactly one basecoat layer (BL2-a) (step (2)(a)).

The terms "basecoat composition" and "basecoat layer" in relation to the coating compositions applied and coating films produced in step (2) of the inventive process are used for the sake of better clarity. The basecoat layer or layers is/are cured together with the clearcoat material, the curing is thus achieved analogously to the curing of so-called basecoat compositions used in the standard method described in the introduction. More particularly, the coating compositions used in step (2) of the process of the invention are not cured separately, like the coating compositions referred to as primer-surfacers in the context of the standard methods. In connection with step (2)(b), the basecoat compositions and basecoat layers are generally designated by (bL2-x) and (BL2-x), wherein the x is be replaced by other appropriate letters in the naming of the specific individual basecoat compositions and basecoat layers.

The aqueous basecoat composition (bL2a) or at least one of the aqueous basecoat compositions (bL2-x), preferably all aqueous basecoat compositions (bL2-x), is preferably a one-component or two-component coating composition.

A preferred embodiment of variant (b) of step (2) of the inventive process is the use of exactly two basecoat compositions. Thus, two aqueous basecoat compositions (bL2-a) and (bL2-z) are applied in direct sequence directly to the cured first coating layer (S1) to form two basecoat layers (BL2-a) and (BL2-z) directly upon each other. The presence of two basecoat layers (BL2-a) and (BL2-z) after step (2)(b) of the inventive process does not necessarily mean that the basecoat compositions (bL2-a) and (bL2-z) differ from each other. It simply means that two coating layers are formed by sequential use of at least one basecoat composition. Each basecoat composition can be applied either by electrostatic spray application (ESTA) or by pneumatic spray application. It is also possible to apply the first basecoat composition (bL2-a) by electrostatic spray application (ESTA) and the second basecoat composition (bL2-z) by pneumatic spray application. The latter application sequence is especially preferred if the basecoat compositions (bL2-a) and (bL2-z) both contain effect pigments because ESTA application can guarantee good material transfer or only a small paint loss in the application while the pneumatic application which then follows achieves good alignment of the effect pigments and hence good properties of the overall multilayer coating, especially a high flop.

The basecoat compositions used in step (2) of the inventive process contain at least one binder. A preferred aqueous basecoat composition (bL2a) or at least one of the preferred aqueous basecoat compositions (bL2-x), preferably all aqueous basecoat compositions (bL2-x), comprises at least one hydroxy-functional polymer as binder, said at least one hydroxy-functional polymer being selected from the group consisting of a polyurethane, a polyester, a polyacrylate, copolymers thereof and mixtures of these polymers. Preferred polyurethane-polyacrylate copolymers (acrylated polyurethanes) and the preparation thereof are described, for example, in WO 91/15528 A1, page 3 line 21 to page 20 line 33, and in DE 4437535 A1, page 2 line 27 to page line 22. The binders preferably possess an OH number in the range from 20 to 200 mg KOH/g, more preferably from 40 to 150 mg KOH/g.

The proportion of the binder, preferably the at least one polyurethane-polyacrylate copolymer, is preferably in the range from 0.5 to 20% by weight, more preferably 1 to 15% by weight, especially preferably 1.5 to 10% by weight, based in each case on the total weight of the aqueous basecoat composition.

The basecoat compositions used in step (2) of the inventive process are favorably colored, i.e. they preferably contain at least one coloring and/or effect pigment. Such color pigments and effect pigments are known to those skilled in the art and are described, for example, in Römpp-Lexikon Lacke and Druckfarben, Georg Thieme Verlag, Stuttgart, New York, 1998, pages 176 and 451. The terms "coloring pigment" and "color pigment" are interchangeable, just like the terms "visual effect pigment" and "effect pigment". Thus, the aqueous basecoat composition (bL2a) or at least one of the aqueous basecoat compositions (bL2-x), especially all aqueous basecoat compositions (bL2-x), preferably comprise at least one coloring and/or effect pigment. Very preferably, the effect pigment is different from the glass flakes of composition (Z3) used in step (4) of the inventive process.

In this regard, preferred coloring pigments are selected from the group consisting of (i) white pigments such as titanium dioxide, zinc white, zinc sulfide or lithopone; (ii) black pigments such as carbon black, iron manganese black, or spinel black; (iii) chromatic pigments such as ultramarine green, ultramarine blue, manganese blue, ultramarine violet, manganese violet, red iron oxide, molybdate red, ultramarine red, brown iron oxide, mixed brown, spinel phases and corundum phases, yellow iron oxide, bismuth vanadate; (iv) organic pigments such as monoazo pigments, bisazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, prinone pigments, perylene pigments, phthalocyanine pigments, aniline black; and (v) mixtures thereof.

Useful effect pigments are selected from the group consisting of (i) platelet-shaped metal effect pigments such as lamellar aluminum pigments, (ii) gold bronzes; (iii) oxidized bronzes and/or iron oxide-aluminum pigments; (iv) pearlescent pigments such as pearl essence; (v) basic lead carbonate; (vi) bismuth oxide chloride and/or metal oxide-mica pigments; (vii) lamellar pigments such as lamellar graphite, lamellar iron oxide; (viii) multilayer effect pigments composed of PVD films; (ix) liquid crystal polymer pigments; and (x) mixtures thereof.

The at least one coloring and/or effect pigment is preferably present in the at least one aqueous basecoat composition (bL2a) or in at least one of the aqueous basecoat compositions (bL2-x), preferably in all aqueous basecoat compositions (bL2-x), in a total amount 1 to 40% by weight, preferably 2 to 35% by weight, more preferably 5 to 30% by weight, based on the total weight of the aqueous basecoat composition (bL2a) or (bL2-x) in each case.

In addition, the basecoat compositions used in step (2) of the inventive process preferably comprises at least one typical crosslinking agent known per se. Favorably, the aqueous basecoat composition (bL2a) or at least one of the aqueous basecoat compositions (bL2-x), preferably all aqueous basecoat compositions (bL2-x), comprises at least one crosslinking agent selected from the group consisting of blocked and/or free polyisocyanates and aminoplast resins. Among the aminoplast resins, melamine resins in particular are preferred.

The proportion of the crosslinking agents, especially aminoplast resins and/or blocked polyisocyanates, more preferably aminoplast resins, among these preferably melamine resins, is preferably in the range from 0.5 to 20% by weight, more preferably 1 to 15% by weight, especially preferably 1.5 to 10% by weight, based in each case on the total weight of the aqueous basecoat composition (bL2a) or (bL2-x).

Preferably, the basecoat composition(s) used in step (2) of the inventive process additionally comprises at least one thickener. Suitable thickeners are inorganic thickeners from the group of the sheet silicates. Lithium-aluminum-magnesium silicates are particularly suitable. As well as the organic thickeners, however, it is also possible to use one or more organic thickeners. These are preferably selected from the group consisting of (meth)acrylic acid-(meth)acrylate copolymer thickeners, for example the commercial product Rheovis AS S130 (BASF), and of polyurethane thickeners, for example the commercial product Rheovis PU 1250 (BASF). The thickeners used are different than the above-described polymers, for example the preferred binders. Preference is given to inorganic thickeners from the group of the sheet silicates. The proportion of the thickeners is preferably in the range from 0.01 to 5% by weight, preferably 0.02 to 4% by weight, more preferably 0.05 to 3% by weight, based in each case on the total weight of the aqueous basecoat composition (bL2a) or (bL2-x).

In addition, the aqueous basecoat composition (bL2a) or (bL2-x) may also comprise at least one additive. Examples of such additives are salts which can be broken down thermally without residue or substantially without residue, resins as binders that are curable physically, thermally and/or with actinic radiation and are different than the polymers already mentioned, further crosslinking agents, organic solvents, reactive diluents, transparent pigments, fillers, dyes soluble in a molecular dispersion, nanoparticles, light stabilizers, antioxidants, deaerating agents, emulsifiers, slip additives, polymerization inhibitors, initiators of free-radical polymerizations, adhesion promoters, flow control agents, film-forming assistants, sag control agents (SCAs), flame retardants, corrosion inhibitors, waxes, siccatives, biocides, and flatting agents. Suitable additives of the aforementioned kind are known, for example, from German patent application DE 199 48 004 A1, page 14 line 4 to page 17 line 5, German patent DE 100 43 405 01, column 5, paragraphs [0031] to [0033]. They are used in the customary and known amounts. For example, the proportion thereof may be in the range from 1.0 to 20% by weight, based in each case on the total weight of the aqueous basecoat composition (bL2a) or (bL2-x).

The solids content of the basecoat compositions (bL2a) or (bL2-x) may vary according to the requirements of the individual case. The solids content is guided primarily by the viscosity required for application, more particularly for spray application, and so may be adjusted by the skilled person on the basis of his or her general art knowledge, optionally with assistance from a few exploratory tests. The solids content of the basecoat compositions (bL2a) or (bL2-x) is preferably 5 to 70% by weight, more preferably 8 to 60% by weight, most preferably 12 to 55% by weight. The solid content can be determined as described in the examples.

The basecoat composition (bL2a) or (bL2-x) is aqueous. The expression "aqueous" is known in this context to the skilled person. The phrase refers in principle to a basecoat composition which is not based exclusively on organic solvents, i.e., does not contain exclusively organic-based solvents as its solvents but instead, in contrast, includes a significant fraction of water as solvent. "Aqueous" for the purposes of the present invention should preferably be understood to mean that the basecoat composition has a water fraction of at least 40% by weight, preferably at least 45% by weight, very preferably at least 50% by weight, based in each case on the total amount of the solvents present (i.e., water and organic solvents). Preferably in turn, the water fraction is 40 to 95% by weight, more particularly 45 to 90% by weight, very preferably 50 to 85% by weight, based in each case on the total amount of solvents present.

The basecoat compositions used in accordance with the invention can be produced using the mixing assemblies and mixing techniques that are customary and known for the production of basecoat materials.

After application, the basecoat composition (bL2a) or (bL2-x) is/are flashed off for example at ambient temperature for 5 min and then intermediately dried at 80° C. for 10 minutes.

Step (3):

In the optional step (3) of the process of the invention, a clearcoat layer (C1) is produced directly on the uncured basecoat layer (BL2a) or uppermost basecoat layer (BL2-z). This production is accomplished by corresponding application of a clearcoat material (c1). Direct application of the clear coat composition (c1) on the uncured basecoat layer (BL2a) or uppermost basecoat layer (BL2-z) results in direct contact of the clearcoat layer (C1) and the basecoat layer (BL2a) or (BL2-z). Thus, there is no other coat present between layers (C1) and (BL2a) or (BL2-z).

The clearcoat composition (c1) may be any desired transparent coating material known in this sense to the skilled person. "Transparent" means that a film formed with the coating material is not opaquely colored, but instead has a constitution such that the color of the underlying basecoat system is visible. As is known, however, this does not rule out the possible inclusion, in minor amounts, of pigments in a clearcoat material, such pigments possibly supporting the depth of color of the overall system, for example.

The clearcoat compositions in question are aqueous or solvent-containing transparent coating materials, which may be formulated not only as one-component but also as two-component or multicomponent coating materials. Also suitable, furthermore, are powder slurry clearcoat materials. Solvent-borne clearcoat materials are preferred.

The clearcoat compositions (cl) used may in particular be thermochemically curable and/or actinic-chemically curable. In particular they are thermochemically curable and externally crosslinking. Preference is given to thermochemically curable two-component clearcoat materials.

Typically and preferably, therefore, the clearcoat compositions comprise at least one (first) polymer as binder, having functional groups, and at least one crosslinker having a functionality complementary to the functional groups of the binder. With preference at least one hydroxy-functional poly(meth)acrylate polymer is used as binder, and a free polyisocyanate as crosslinking agent. Suitable clearcoat materials are described in, for example, WO 2006042585 A1, WO 2009077182 A1, or else WO 2008074490 A1.

The clearcoat compositions (c1) is applied by the methods known to the skilled person for applying liquid coating materials, as for example by dipping, knifecoating, spraying, rolling, or the like. Preference is given to employing spray application methods, such as, for example, compressed air spraying (pneumatic application), and electrostatic spray application (ESTA).

The clearcoat composition (c1) or the corresponding clearcoat layer (C1) is subjected to flashing and/or interim-drying after application, preferably at 15 to 35° C. for a duration of 0.5 to 30 minutes. These flashing and interim-drying conditions apply in particular to the preferred case where the clearcoat composition (c1) comprises a thermo-chemically curable two-component coating material. But this does not rule out the clearcoat composition (c1) being an otherwise-curable coating material and/or other flashing and/or interim-drying conditions being used.

After flashing and/or interim-drying of the clearcoat composition (c1) applied in step (3) of the inventive process, this layer is cured jointly with the basecoat layer (BL2a) or the basecoat layers (BL2-x) applied in step (2) of the inventive process. Curing is preferably performed at a temperature of 60 to 160° C. for a duration of 5 to 60 minutes. After curing, the clearcoat layer (C1) preferably has a film thickness of 15 to 80 μm, more preferably 20 to 65 μm, very preferably 25 to 60 μm.

Step (4):

In step (4) of the inventive process, a glass flake containing coating layer (L3) is produced directly on the basecoat layer (BL2a) or the uppermost basecoat layer (BL2-z) or the cured clearcoat layer (C1). The glass flake containing layer (L3) is produced by applying a composition (Z2) directly to the basecoat layer (BL2a) or the uppermost basecoat layer (BL2-z) or the cured clearcoat layer (C1). After application, the composition (Z2) is flashed off for example at ambient temperature for 5 min and then intermediately dried, for example at 80° C. for 10 minutes.

The composition (Z2) used in step (4) of the inventive process contains at least one binder B, at least one solvent L and a mixture of platelet glass flake pigments GF1 and GF2 having specific particle sizes. The mixture of platelet glass flake pigments GF1 and GF2 leads to an outstanding degree of sparkle and can achieve very attractive luster effects of the multilayer coating.

The manufacture of synthetic platelets such as glass flakes often results in a size distribution of the platelets that can be characterized by Gaussian curves. A particularly useful means of characterizing the size distribution of a mass of synthetic platelets produced and used as substrates for effect pigments is by specifying the platelet size of the lowest 10 vol.-%, 50 vol.-%, and 90 vol.-% of platelets along the Gaussian curve. This classification can be characterized as the $D_{10}$, $D_{50}$, and $D_{90}$ values of the platelet size distribution. Thus, a substrate having a $D_{90}$ of a certain size means that 90 vol.-% of the glass flakes have a size up to that value. The average particle size can be measured using laser diffraction. The platelet glass flake pigments GF1 have an average particle size $D_{90}$ of 30 to 54 μm. However, it is preferred to use at least one platelet glass flake pigment GF1 having an average particle size $D_{90}$ of 32 to 52 μm, preferably 33 to 50 μm, more preferably 34 to 48 μm, very preferably 37 to 47 μm, measured by means of laser diffraction according to DIN EN ISO 13320:2009-10 in each case.

Apart from a small average particle size $D_{90}$, the at least one platelet glass flake GF1 preferably has a narrow particle size distribution. This particle size distribution can be characterized by the span ΔD, which is defined as $\Delta D=(D_{90}-D_{10})/D_{50}$, wherein a small span ΔD is corresponding to a narrow particle size distribution. Favorably, the at least one platelet glass flake pigment GF1 has a volume-averaged cumulative undersize distribution curve with the characteristic numbers $D_{10}$, $D_{50}$ and $D_{90}$, said cumulative undersize distribution curve having a span ΔD of 0.6 to 3.0, preferably 0.8 to 2.5, and the span ΔD being calculated in accordance with the following formula (I): $\Delta D=(D_{90}-D_{10})/D_{50}$ (I). This narrow particle size distribution can be obtained, for example, if the at least one platelet glass flake GF1 has a $D_{10}$ particle size of 1 to 25 μm, preferably 5 to 15 μm and a $D_{50}$ particle size of 10 to 35 μm, preferably 17 to 27 μm. The narrow particle size distribution leads to an extraordinary color purity at a constant angle of light incidence and angle of viewing of the at least one platelet glass flake GF1, especially if the glass flakes are coated with a metal oxide to provide interference color.

A particularly preferred glass flake GF1 therefore has the following particle size distribution: $D_{10}$=5 to 15 μm, $D_{50}$=17 to 27 μm and $D_{90}$=37 to 47 μm. The span ΔD resulting from this distribution is thus 1.15 to 1.9.

Apart from the at least one platelet glass flake GF1, the composition (Z2) used in step (4) of the inventive process further contains at least one platelet glass flake GF2 having a larger average particle size $D_{90}$ of 55 to 80 μm. However, it is preferred if the at least one platelet glass flake pigment GF2 has an average particle size $D_{90}$ of 55 to 78 μm, preferably 55 to 75 μm, more preferably 55 to 70 μm, very preferably 55 to 65 μm, measured by means of laser diffraction according to DIN EN ISO 13320:2009-10 in each case. Only the combination of at least one glass flake GF1 having an average particle size $D_{90}$ of lower than 55 μm and at least one glass flake GF2 having an average particle size $D_{90}$ of 55 to 80 μm allows to achieve a visually appealing effect of the multilayer coating. If only glass flakes having particles sizes $D_{90}$ of lower than 55 μm are used, the desired sparkling effect cannot be achieved. If only glass flakes having particle sizes $D_{90}$ of 55 μm or higher are used, the sparkling effect achieved is too intense and thus no longer visually appealing.

It is also highly desirable if the at least one platelet glass flake GF2 also has a narrow particle size. The at least one platelet glass flake pigment GF2 has a volume-averaged cumulative undersize distribution curve with the characteristic numbers $D_{10}$, $D_{50}$ and $D_{90}$, said cumulative undersize distribution curve having a span ΔD of 0.6 to 2.7, preferably 0.9 to 2.3, and the span ΔD being calculated in accordance with the following formula (I): $\Delta D=(D_{90}-D_{10})/D_{50}$ (I). This narrow particle size distribution can be obtained, for example, if the at least one platelet glass flake GF2 has a $D_{10}$ particle size of 5 to 30 μm, preferably 10 to 20 μm and a $D_{50}$ particle size of 15 to 45 μm, preferably 25 to 35 μm.

A particularly preferred glass flake GF2 therefore has the following particle size distribution: $D_{10}$=10 to 20 μm, $D_{50}$=25 to 35 μm and $D_{90}$=55 to 65 μm. The span ΔD resulting from this distribution is thus 1.25 to 1.8.

In order to achieve a visually appealing effect of the multilayer coating, it is favorable if the at least one platelet glass flake GF1 and the at least one platelet glass flake GF2 are comprised in the composition (Z2) in a specific weight ratio. Thus, a preferred composition (Z2) comprises a weight ratio of the at least one platelet glass flake pigment GF1 to the at least one platelet glass flake pigment GF2 from 3:1 to 1:3, preferably of 2:1 to 1:2, very preferably of 1:1. Use of a 1:1 weight ratio of the two different glass flakes GF1 and GF2 having specific average particle sizes $D_{90}$ leads to a visually appealing effect of the resulting multilayer coating.

If a weight ratio of more than 3:1 to 1:3 is used, either the sparkling effect is hardly noticeable or the achieved sparkling effect is too strong and thus perceived as unappealing by the customer.

Suitable glass flake pigments are favorably such that show a high degree of sparkle and luster. Such sparkle glass flake pigments usually comprise a flake or platelet shaped glass core and a coating of the core. The coating can be varied and/or tinted so that different color shades and brightness shades can be achieved. Preferably, the at least one platelet glass flake pigment GF1 and the at least one platelet glass flake pigment GF2 are each selected from coated glass flake pigments, said coating being selected from the group consisting of titanium dioxide, zinc oxide, tin oxide, iron oxide, silicon oxide, copper, gold, platinum, aluminum, alumina and mixtures thereof, preferably titanium oxide and/or tin oxide. By choice of coating material and layer thickness, color of the pigment can be tuned as shown below:

| Coating | Layer thickness | color |
|---|---|---|
| $TiO_2$ | 40-60 nm | silver |
| | 60-80 nm | yellow |
| | 80-100 nm | red |
| | 100-140 nm | blue |
| | 120-160 nm | green |
| | 280-320 nm | green (IIIrd order) |
| $Fe_2O_3$ | 35-45 nm | bronze |
| | 45-55 nm | copper |
| | 55-65 nm | red |
| | 65-75 nm | red-violet |
| | 75-85 nm | red-green |
| $Fe_3O_4$ | | black |
| $TiO_2/Fe_2O_3$ | | gold tones |
| $TiO_2/Cr_2O_3$ | | green |
| $TiO_2$/Prussian Blue | | dark blue |

The wide variety of colors achieved by coating the platelet glass flakes GF1 and GF2 with the afore-stated metal oxides and mixtures thereof allows to obtain very special effects in the resulting multilayer coating. Apart from adding a sparkling effect to the underlaying basecoat layer (BL2a) or (BL2-x), it is also possible to brighten or enhance the tone of the basecoat layer (BL2a) or (BL2-x) and to achieve color mixing effects, for example by adding a green or silver sparkle to a black basecoat layer (BL2a) or (BL2-x). This allows to provide a huge variability in terms of shade and appearance of a multilayer coating and significantly increase the color range of already available basecoat colors, without changing the composition of the basecoats currently used in the automotive and refinish industry.

Preferred platelet glass flakes GF1 and GF2 have a coating of titanium dioxide, which may be present in the rutile or anatase crystal polymorph. The best-quality and most stable pearlescent pigments are obtained when the titanium dioxide layer is in the rutile form. The rutile form can be obtained by, for example, applying a layer of $SnO_2$ to the substrate or the pigment before the titanium dioxide layer is applied. Applied to a layer of $SnO_2$, $TiO_2$ crystallizes in the rutile polymorph.

The platelet glass flake pigments GF1 and GF2 may additionally be coated with an outer protective layer to provide better protection from weathering. This layer comprises or is composed preferably of one or two metal oxide layers of the elements Si, Al or Ce. The outer protective layer may also be organic-chemically modified on the surface. By way of example, one or more silanes may be applied to this outer protective layer. The silanes may be alkylsilanes having branched-chain or unbranched alkyl radicals of 1 to 24 C-atoms, preferably 6 to 18 C-atoms.

Preferably, the at least one platelet glass flake pigment GF1 and the at least one platelet glass flake pigment GF2 each comprise the coating in a total amount of 10 to 25% by weight, based on the total weight of glass flake pigment GF1 or GF2.

The glass substrate of preferred glass flake pigments GF1 and GF2 contains 65 to 75 wt.-% silicon oxide, preferably $SiO_2$, 2 to 9 wt.-% aluminum oxide, preferably $Al_2O_3$, 0.0 to 5 wt.-% calcium oxide, preferably CaO, 5 to 12 wt.-% sodium oxide, preferably $Na_2O$, 8 to 15 wt.-% boron oxide, preferably $B_2O_3$, 0.1 to 5 wt.-% titanium oxide, preferably $TiO_2$, 0 to 5 wt.-% zirconium oxide, preferably $ZrO_2$, based on the weight of said glass flakes. Platelet glass flake pigments GF1 and GF2 comprising the afore-stated glass composition have a superior mechanical stability against mechanical forces occurring during line circulation, a reduced hardness and a higher gloss. The great advantage of a reduced hardness is, for example, that the pipe or nozzles through which the composition (Z2) is pumped is not damaged by abrasion as is the case with pigments having an increased hardness.

Glass flakes GF1 and GF2 contained in the composition (Z2) preferably have a specific aspect ratio. The aspect ratio is the ratio of the size of the glass flakes in different dimensions, in this case, the ratio of the thickness to the particle size. Favorably, the at least one platelet glass flake pigment GF1 and the at least one platelet glass flake pigment GF2 each have an aspect ratio of 20 to 10,000, preferably 30 to 3,000, very preferably 35 to 1, 500. The glass flakes GF1 and GF2 used in composition (Z2) thus have a very small thickness in relation to the particle size. This facilitates parallel orientation to the substrate, resulting in a higher quality appearance and sparkle of the cured layer (L3) even when very low amounts of the platelet glass pigment are included in composition (Z2).

If substrates below an average thickness of 500 nm are coated with high-index metal oxides, then the substrate has a marked optical influence on the interference color of the system as a whole. The effect pigments obtained, consequently, no longer have the desired high color purity. Moreover, there is a marked decrease in the mechanical stability of these effect pigments with respect, for example, to shearing forces. Above an average substrate layer thickness of 2,000 nm, the effect pigments become too thick overall. This entails a poorer opacity and also a lower level of plane-parallel orientation within the application medium. The poorer orientation results in turn in a reduced luster. Therefore, the at least one platelet glass flake pigment GF1 and the at least one platelet glass flake pigment GF2 each preferably have a total thickness of 500 to 2,000 nm, preferably 750 to 2,000 nm.

The composition (Z2) preferably contains the platelet glass flake pigments GF1 and GF2 in very small amounts. Despite this small amounts, an outstanding visual appearance, specially a high degree of sparkle and luster, can be achieved. It is thus preferred if the composition (Z2) comprises the at least one platelet glass flake pigment GF1 in a total amount of 0.001 to 0.8% by weight, preferably 0.003 to 0.7% by weight, more preferably 0.02 to 0.6% by weight, even more preferably 0.04 to 0.4% by weight, very preferably 0.08 to 0.12% by weight, based on the total weight of the composition (Z2) in each case.

It is moreover preferred, if the composition (Z2) comprises the at least one platelet glass flake pigment GF2 in a total amount of 0.001 to 0.8% by weight, preferably 0.003 to 0.7% by weight, more preferably 0.02 to 0.6% by weight, even more preferably 0.04 to 0.4% by weight, very preferably 0.08 to 0.12% by weight, based on the total weight of the composition (Z2) in each case.

Apart from the at least one platelet glass flake GF1 and GF2, the composition (Z2) used in step (4) further comprises at least one binder B. The at least one binder B is favorably selected from the group consisting of hydroxy-functional polyurethane polymers, poly(meth)acrylate polymers, acid-functional polyurethane poly(meth)acrylate hybrid polymers and mixtures thereof.

Preferred hydroxy-functional polyurethane polymers are obtained by reacting:

(1) a polyester component comprising of the reaction product of a carboxylic acid component wherein said carboxylic acid component is comprised of at least 50% by weight of at least one long-chain carboxylic acid of from between 18 and 60 carbon atoms, and at least one short-chain dicarboxylic acid; and b) an alcohol having at least two hydroxyl groups;

(2) a multi-functional compound having at least one active hydrogen and at least one carboxylic acid functionality;

(3) a compound having at least two active hydrogen groups selected from the group consisting of hydroxyl, sulfhydryl, primary amine, and secondary amine, said primary amines accounting for one active hydrogen; and (4) a polyisocyanate.

The polyester resin (1) is preferably formed from an alcohol component having at least about two hydroxy groups per molecule (denoted polyol hereinafter) and a carboxylic acid component.

The carboxylic acid component is comprised of at least about 50% by weight of a long chain carboxylic acid containing compound having between 18 and 60 carbon atoms in the chain. Preferably, the long chain fatty acid comprises between about 50 and 80% by weight of the acid component of the polyester polyol. In the principal resin (major vehicle) the long chain fatty acid component comprises about 75-80% of the polyester resin. This long-chain carboxylic acid component is an alkyl, alkylene, aralkyl, aralkylene, or compound of similar hydrophobicity having 18 to 60 carbons in the chain. Most preferably, this long chain carboxylic acid is a dicarboxylic acid and most preferably is a $C_{36}$ dicarboxylic acid known as a dimer acid. The $C_{36}$ dimer fatty acid fraction consists essentially of dimer ($C_{36}$ dicarbocylic acids) together with amounts up to about 20-22% of $C_{54}$ trimer. However, those of skill in the art refer to this dimer-trimer mixture as "dimer", and this practice is followed herein. The preferred grade contains 97% dimer and 3% trimer. The remaining carboxylic acid may be comprised of a short-chain monocarboxylic or dicarboxylic acid component, preferably a dicarboxylic acid. The short-chain dicarboxylic acid may be preferably short-chain alkyl or alkylene dicarboxylic acid, for example, azelaic acid, adipic acid, or an equivalent aliphatic dicarboxylic acid or an aromatic dicarboxylic acid. Most preferably, the aromatic dicarboxylic acid is isophthalic acid. Where branch chains in the polyester are desired, a carboxylic acid containing three or more carboxylic acid groups, or incipient carboxylic acid groups, present as anhydride groups. A preferred acid of this type is trimellitic anhydride, i.e. the 1,2-anhydride of 1,2,4-benzenetricarboxylic acid.

The polyols which are usually employed in making the polyester resins (1) include diols, for example, alkylene glycols, such as ethylene glycol, propylene glycol, butylene glycol, and neopentyl glycol, 1,6-hexanediol and other glycols such as hydrogenated bisphenol A, cyclohexane dimethanol, caprolactone diol (i.e., the reaction product of caprolactone and ethylene glycol), hydroxyalkylated bisphenols, and the like. However, other diols of various-types and polyols of higher functionality may also be utilized. Such higher functional alcohols can include, for example, trimethylolpropane, trimethylolethane, pentaerythritol and the like, as well as higher molecular weight polyols.

The low molecular weight diols which are preferred are known in the art. They have hydroxy values of 200 or above, usually within the range of 200 to 2,000. Such materials include aliphatic diols, particularly alkylene polyols containing from 2 to 18 carbon atoms. Examples include ethylene glycol, 1,4-butanediol, cycloaliphatic diols such as 1,2-cyclohexanediol and cyclohexane dimethanol. An especially preferred diol is 1,6-hexanediol.

The polyester resins (1) are synthesized from the above-described carboxylic acid component and an excess of a polyol component. An excess of polyol is used so that the polyester resin preferably contains terminal hydroxyl groups. The polyol compounds preferably have an average hydroxy-functionality of at least two. A preferred polyester resin (1) is produced with dimer fatty acid as the long chain carboxylic acid, isophthalic acid as the minor short-chain carboxylic acid component and an excess of 1,6-hexanediol so that the resulting polyester polyol ranges in size between about 200 and 2000 grams per equivalent of hydroxyl. Preferably, the polyester resin (1) has a range between 700 and 800 grams per equivalent of hydroxyl and most preferably, has about 750 grams per equivalent of hydroxyl.

The organic polyisocyanate which is reacted with the polyhydric material as described is essentially any polyisocyanate and is preferably a diisocyanate, e.g., hydrocarbon diisocyanates or substituted hydrocarbon diisocyanates. Many such organic diisocyanates are known in the art, including biphenyl-4,4'-diisocyanate, toluene diisocyanate, 3,3'-dimethyl-4,4-biphenylene diisocyanate. 1,4-tetramethylene diisocyanate, 1,6-hexamethylene diisocyanate, 2,2,4-trimethylhexane-1,6-diisocyanate, methylene-bis-(phenylisocyanate), 1,5-naphthalene diisocyanate, bis-(isocyanatoethyl fumarate), isophorone diisocyanate (IPDI), and methylene-bis-(4-cyclohexylisocyanate). Isocyanate terminated adducts of polyols can also be employed, such as adducts of polyols including ethylene glycol, 1,4-butylene glycol, trimethylolpropane etc. These are formed by reacting more than one mol of a diisocyanate, such as those mentioned, with one mol of polyol to form a longer chain diisocyanate. Alternatively, the polyol can be added along with the diisocyanate.

It is preferred to employ an aliphatic diisocyanate, since it has been found that these provide better color stability in the finished coating. Examples include 1,6-hexamethylene diisocyanate, 1,4-butylene diisocyanate, methylene-bis-(4-cyclohexylisocyanate) and isophorone diisocyanate. Mixtures of diisocyanates can also be employed.

For purposes of promoting water-dispersibility it is important to build acid groups into the polyurethane. For example, the presence of acid groups allows to stably disperse the polymer in water and to use this dispersion in aqueous compositions. The acids that are employed to provide free acid groups in the polyurethane resins of this invention are readily available. They contain at least one active hydrogen group and at least one carboxylic acid functionality. The active hydrogen group may be a thiol, a hydroxyl or an amine, with primary amines being considered to have one active hydrogen group. Examples of such compounds include hydroxyl carboxylic acids, amino acids, thiol acids, aminothiol acids, alkanolamino acids, and hydroxythiol acids. Compounds containing at least two hydroxyl groups and at least one carboxylic acid are preferred. Examples of such compounds include 2,2-bis-(hydroxymethyl) acetic acid, 2,2,2-tris-(hydroxymethyl)-acetic acid, 2,2-bis(hydroxymethyl)propionic acid, 2,2-bis-(hydroxymethyl)butyric acid 2,2-bis-(hydroxymethyl)-pentanoic acid and the like. The preferred acid is 2,2-bis-(hydroxymethyl)propionic acid.

To produce the polyurethane polymer, the above-described polyester polyol is reacted with a mixture of a polyisocyanate, a multi-functional compound having at least one active hydrogen group and at least one carboxylic acid group, and optionally, a component comprising a chemical compound having at least two active hydrogen groups, but no carboxylic acid groups. This reaction is usually carried out at temperatures between 180° and 280° C., if desired in the presence of a suitable esterification catalyst, such as, for example, lithium octoate, dibutyltin oxide, dibutyltin dilaurate, para-toluenesulfonic acid, and the like. The polyester, polyisocyanate and multi-functional compound may also be reacted in the same pot, or may be reacted sequentially, depending upon the desired results. Sequential reaction produces polymers which are more ordered in structure. Longer-chain polyurethane resins can be obtained by chain extending the polyurethane chain with a compound or mixture of compounds containing at least two active hydrogen groups but having no carboxylic acid group, for example diols, dithiols, diamines, or compounds having a mixture of hydroxyl, thiol and amine groups, for example, alkanolamines, aminoalkyl mercaptans, and hydroxyalkyl mercaptans, among others. Alkanolamines, for example, ethanolamine or diethanolamine, are preferably used as chain extenders, and most preferably a diol is used. Examples of preferred diols which are used as polyurethane chain extenders include 1,6-hexanediol, cyclohexanedimethylol, and 1,4-butanediol. A particularly preferred diol is neopentyl glycol.

A particular preferred hydroxy-functional polyurethane polymer is obtained by reacting an isocyanate functional polyurethane prepolymer prepared from:

(1) a polyester component comprising of the reaction product of
  a carboxylic acid component wherein said carboxylic acid component is comprised of 50 to 60% by weight of a $C_{36}$ dicarboxylic acid, and 25 to 35% by weight of isophthalic acid; and
  1,6-hexanediol,
(2) 2,2-bis-(hydroxymethyl)propionic acid;
(3) neopentyl glycol; and
(4) isophorone diisocyanate with trimethylol propane. The reaction is preferably performed in an organic solvent, like methyl isobutyl ketone.

The hydroxyl value of the polyurethane polymer should by at least 5 and preferably 40 to 80 mg KOH/g solid polymer as determined according to DIN 53240-2:2007-07. The acid value should preferably be 20 to 30 mg KOH/g solid polymer, as determined according to DIN EN ISO 2114:2002-06.

The polyurethane polymer preferably has an average molecular weight Mw of 40,000 to 85,000 g/mol, as determined via gel permeation chromatography using polymethyl methacrylate as internal standard.

It is favorable to neutralize at least part of the carboxylic acid groups of the polyurethane polymer to increase water-solubility with at least one inorganic or organic, preferably organic, base, for example ammonia, morpholine, an N-alkylmorpholine, monoisopropanolamine, methyl ethanolamine, methyl isopropanolamine, dimethyl ethanolamine, diisopropanolamine, diethanolamine, triethanolamine, diethyl ethanolamine, triethanolamine, methylamine, ethylamine, propylamine, butylamine, 2-ethylhexylamine, dimethylamine, diethylamine, dipropylamine, dibutylamine, trimethylamine, triethylamine, triisopropylamine, tributylamine and mixtures thereof. The level of neutralization is preferably 60 to 75%.

The resulting polymer is preferably dispersed in water and the organic solvent is removed so that an aqueous dispersion of the preferred hydroxy-functional polyurethane polymer is obtained.

The polyurethane polymer, especially the particularly preferred hydroxy-functional polyurethane polymer previously described, is preferably present in a total amount of 3 to 20% by weight, more preferably 5 to 15% by weight, very preferably 6 to 10% by weight, based on the total weight of the composition (Z2).

The acid-functional polyurethane poly(meth)acrylate hybrid polymer can be obtained by radical polymerization of ethylenically unsaturated monomers in the presence of a polyurethane polymer. Acid-functional denotes a polymer having at least one carboxylic acid group, preferably a plurality of carboxylic acid groups, which may be fully or partially neutralized with a base.

The polyurethane polymer is preferably obtained by reacting a polyester resin with a polyol, a polyisocyanate compound and a polyhydric alcohol. The polyester resin can be obtained as previously described. Preferred polyester resins, polyisocyanate compounds and polyhydric alcohols have already been described with respect to the hydroxy-functional polyurethane. The polyhydric alcohol can be a glycol or a trihydric or higher polyhydric alcohol. Glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butane diol, 1,4-butane diol, 1,5-pentane diol, 1,6-hexane diol, 2-butyl-2-ethyl-1,3-propane diol, methyl propane diol, cyclohexane dimethanol, 3,3-diethyl-1,5-pentane diol and the like. In addition, trihydric or higher polyhydric alcohols include glycerin, trimethylolethane, trimethylolpropane, pentaerythritol, dipentaerythritol and the like. The most preferred polyhydric alcohol is neopentyl glycol.

The number average molecular weight of the polyurethane resin is not particularly limited, but is between 500 and 50,000 g/mol. Specific examples of this number average molecular weight include 500, 1,500, 2,500, 3,500, 4,500, 5,500, 6,500, 7,500, 10,000, 15,000, 20,000, 30,000, 40,000 and 50,000 g/mol, The number average molecular weight can be obtained by gel permeation chromatography (GPC) using polystyrene as a standard substance.

The (meth)acrylic polymer can be obtained using a radical polymerization reaction using radically polymerizable monomers as raw material components and is synthesized in an aqueous solution or aqueous dispersion of the polyurethane resin. Radically polymerizable monomers include (meth) acrylic acid, methyl (meth) acrylate, ethyl (meth) acrylate, n-propyl (meth) acrylate, isopropyl (meth) acrylate, n-butyl (meth) acrylate, isobutyl (meth) acrylate, sec-butyl (meth) acrylate, hexyl (meth) acrylate, cyclohexyl (meth) acrylate, 2-ethylhexyl (meth) acrylate, octyl (meth) acrylate, lauryl (meth) acrylate, stearyl (meth) acrylate, allyl alcohol, 2-hydroxyethyl (meth) acrylate, 3-hydroxypropyl (meth) acrylate, 4-hydroxybutyl (meth) acrylate, styrene, (meth) acrylonitrile, (meth) acrylamide and the like. It is possible to use one of these radically polymerizable monomers or a combination of two or more types thereof. Most preferred monomers are styrene, n-butyl acrylate, 2-hydroxyethyl acrylate, cyclohexyl methacrylate and acrylic acid and mixtures thereof. To increase water dispersibility of the polymer, the mixture of monomers preferably contains (meth)acrylic acid.

Preferably, the radical polymerization is performed in the presence of at least one radical polymerization initiator. Examples of radical polymerization initiators include azo compounds such as 2,2'-azobisisobutyronitrile, 2,2'-azobis-2,4-dimethylvaleronitrile, 4,4'-azobis-4-cyanovaleric acid, 1-azobis-1-cyclohexane-carbonitrile and dimethyl-2,2'-azobisisobutyrate, or an organic peroxide such as methyl ethyl ketone peroxide, cyclohexanone peroxide, 3,5,5-trimethylcyclohexanone peroxide, 1,1-bis(t-butylperoxy)-3,3,5-trimethylcyclohexane, 1,1-bis(t-butylperoxy) cyclohexanone, 2,2-bis(t-butylperoxy) octane, t-butylhydroperoxide, diisopropylbenzene hydroperoxide, dicumyl peroxide, t-butylcumyl peroxide, isobutyl peroxide, lauroyl peroxide, benzoyl peroxide, diisopropylperoxydicarbonate, t-butylperoxy-2-ethylhexanoate, t-butylperoxyneodecanoate, t-butylperoxylaurate, t-butyl-peroxybenzoate and t-butylperoxyisopropylcarbonate. The quantity of radical polymerization initiator used is, for example, 0.1 to 3.0 parts by mass relative to 100 parts by mass of the radically polymerizable monomers. Specific examples of this quantity include 0.1, 0.5, 1.0, 1.5, 2.0, 2.5 and 3.0 parts by mass.

The reaction temperature during radical polymerization is, for example, 60 to 110° C., specific examples of which include 60, 70, 80, 90, 100 and 110° C.

A particular preferred acid-functional polyurethane poly methacrylate hybrid polymer is obtained by radical polymerization of a mixture of 12 to 15% by weight styrene, 35 to 45% by weight n-butyl acrylate, 20 to 30% by weight 2-hydroxyethyl acrylate and 10 to 20% by weight cyclohexyl methacrylate, based on the total weight of the mixture, in the presence of an initiator and a polyurethane obtained by reacting:

(1) a polyester component comprising of the reaction product of
  - a carboxylic acid component wherein said carboxylic acid component is comprised of 50 to 60% by weight of a $C_{36}$ dicarboxylic acid, and 25 to 35% by weight of isophthalic acid; and
  - 1,6-hexanediol and neopentyl glycol;

(2) neopentyl glycol; and (3) tetramethylxylene diisocyanate and chain extension of the resulting isocyanate functional prepolymer with diethanolamine.

The polyurethane poly(meth)acrylate hybrid polymer preferably contains carboxylic acid groups which can be neutralized in order to increase the stability of this polymer in aqueous coating compositions. The hybrid polymer thus has an acid number, for example, of 30 to 40 mg KOH/g solids, as determined according to DIN EN ISO 2114:2002-06.

The level of neutralization is favorably 60 to 80%. The neutralization can be effected by the aforementioned inorganic and organic bases.

The polyurethane poly(meth)acrylate hybrid polymer is preferably dispersed in water so that an aqueous dispersion of the preferred polyurethane poly(meth)acrylate hybrid polymer is obtained.

The polyurethane poly(meth)acrylate hybrid polymer, especially the particularly preferred acid-functional polyurethane poly(meth)acrylate hybrid polymer previously described, is preferably present in a total amount of 0.1 to 10% by weight, more preferably 0.5 to 5% by weight, very preferably 1 to 3% by weight, based on the total weight of the composition (Z2).

The composition (Z2) preferably comprises a weight ratio of the at least one hydroxy-functional polyurethane polymer to the at least one acid-functional polyurethane poly(meth) acrylate hybrid polymer from 10:1 to 1:2, preferably from 5:1 to 1:1. The stated weight ratios lead to an excellent adhesion of the composition (Z2) on cured and uncured layers, thus allowing a flexible use of this composition in the inventive process.

Favorably, the composition (Z2) comprises the at least one binder B in a total amount of 5 to 20% by weight solids, preferably 8 to 15% by weight solids, very preferably 8 to 12% by weight solids, based on the total weight of the composition (Z2) in each case. Use of the at least one binder in the state amounts leads, especially in combination with the below described crosslinkers, leads to coating films which have a high mechanical stability after curing.

The composition (Z2) comprises at least one solvent L. This solvent L is preferably selected from the group consisting of water, ketones, aliphatic and/or aromatic hydrocarbons, glycol ethers, alcohols, esters and mixtures thereof, preferably water. According to a preferred embodiment, the composition (Z2) used in the inventive process is therefore an aqueous coating composition. This allows to reduce the amounts of organic solvents released into the environment during the inventive process so that this process can be performed in an environmentally friendly manner.

Favorably, the composition (Z2) comprises the at least one solvent L in a total amount of 40 to 80% by weight, preferably 50 to 75% by weight, very preferably 60 to 70% by weight, based on the total weight of the composition (Z2) in each case.

Apart from the mandatory components (i), (ii) and (iii), the composition (Z2) used in step (4) of the inventive process can further comprise at least one compound selected from the group consisting of catalysts, crosslinking agents, thickening agents, neutralizing agents, UV stabilizers and mixtures thereof.

Crosslinking or curing catalysts are preferably selected from blocked acids, which decompose at temperatures used during the curing step into the free acid and the base used for blocking. The released acid then acts as a crosslinking or curing catalyst.

The blocked acids are prepared according to methods well known by preferably carried out in water reactions of acids with amines. Suitable acids can all be used for the present purpose suitable organic or inorganic acids such as hydrochloric acid, phosphoric acid or p-toluenesulfonic acid, with p-toluenesulfonic acid is preferably used. As amines, ammonia, triethylamine, dimethyl or diethylaminoethanol, 2-amino-2-methylpropanol, 2-dimethylamino-2-methylpropanol, 2-amino-2-ethylpro-propanediol-1,3 or 2-amino-2-hydroxymethylpropandiol-1.3 are used.

Surprisingly, particularly yellowing-resistant multilayer coatings can be obtained with particularly good resistance values, when the acid salts are prepared by reacting a suitable acid with 2-amino-2-ethylpropanedio1-1,3 and/or 2-amino-2-methylpropanol.

The catalyst, preferably the blocked acid catalyst, very preferably 2-amino-2-methylpropanol-p-toluene sulfonate, is present in amounts of 0.1 to 2% by weight, based on the total weight of the composition (Z2).

Suitable crosslinking agents to be used in the composition (Z2) are selected from the group consisting of polycarboddiimides, aminoplast resins, polyisocyanates, blocked polyisocyanates and mixtures thereof. The composition (Z2) preferably comprises at least one aminoplast resin as crosslinking agent. These resins are condensation products of aldehydes, especially formaldehyde, with, for example, urea, melamine, guanamine and benzoguanamine. The amino resins contain alcohol groups, preferably methylol groups, which in general are partly or, preferably, fully etherified with alcohols. Use is made in particular of melamine-formaldehyde resins etherified with lower alcohols, particularly with methanol or butanol. Very particular preference is given to using melamine-formaldehyde resins as crosslinking agents which are etherified with lower alcohols, especially with methanol and/or ethanol and/or butanol, and which on average still contain from 0.1 to 0.25 nitrogen-bonded hydrogen atoms per triazine ring.

In this context it is possible to use any amino resins suitable for transparent topcoat or clearcoat materials, or a mixture of such resins. Particularly suitable are the conventional amino resins, some of whose methylol and/or methoxymethyl groups have been functionalized by means of carbamate or allophanate groups.

It is particularly preferred here if the aminoplast resin contains a melamine resin fraction of at least 60% by weight, preferably at least 70% by weight, in particular at least 80% by weight, based in each case on the aminoplast resin.

The crosslinking agents, more particularly at least one melamine-formaldehyde resin etherified with methanol and/or ethanol and/or butanol, is preferably present in the range from 0.5 to 20% by weight, more preferably 3 to 15% by weight, very preferably 4 to 11% by weight, based in each case on the total weight of the composition (Z2).

Preferably, the composition (Z2) additionally comprises at least one thickener, selected from the group consisting of phyllosilicates, (meth)acrylic acid-(meth)acrylate copolymers, hydrophobic polyurethanes, ethoxylated polyurethanes, polyamides and their mixtures.

Suitable thickeners are inorganic thickeners from the group of phyllosilicates such as lithium aluminum magnesium silicates. It is nevertheless known that coating compositions whose profile of rheological properties is determined via the primary or predominant use of such inorganic thickeners can be formulated only with decidedly low solids contents, for example of less than 20%, without a negative influence on important performance properties. A particular advantage of the composition (Z2) is that it can be formulated without a great fraction of such inorganic phyllosilicates employed as thickeners. Accordingly, the fraction of inorganic phyllosilicates used as thickeners, based on the total weight of the composition (Z2), is preferably less than 1% by weight, more preferably less than 0.8% by weight, and very preferably less than 0.7% by weight.

Suitable organic thickeners are, for example, (meth) acrylic acid-(meth)acrylate copolymer thickeners, polyurethane thickeners or polyamide thickeners. Employed with preference are associative thickeners, such as associative polyurethane thickeners. Associative thickeners are water-soluble polymers which have strongly hydrophobic groups at the chain ends or in side chains, and/or whose hydrophilic chains contain hydrophobic blocks or monomers in their backbone. As a result, these polymers possess a surfactant character and can form micelles in an aqueous phase. Similar to surfactants, the hydrophilic regions remain in the aqueous phase, while the hydrophobic regions enter into the particles of polymer dispersions, adsorb on the surface of other solid particles such as pigments and/or fillers, and/or form micelles in the aqueous phase. Thickeners of this kind are available commercially, for example under the trade name Adekanol (from Adeka Corporation). Polyamide thickeners are available commercially under the trade name Disparlon (from Kusumoto Chemicals Ltd).

Particularly preferred is the use of a combination of inorganic thickeners and organic thickeners.

The total proportion of the at least one thickener is preferably 0.1 to 10% by weight, more preferably 0.5 to 8% by weight, very preferably 1 to 4% by weight, based in each case on the total weight of the composition (Z2).

The composition (Z2) can further comprise at least one neutralizing agent, selected from inorganic and organic bases. Suitable organic bases as well as inorganic bases, such as ammonia and hydrazine can be used. Primary, secondary and tertiary amines, for example ethylamine, propylamine, dimethylamine, dibutylamine, cyclohexylamine, benzylamine, morpholine, piperidine and triethanolamine are preferably employed. Tertiary amines, especially dimethylethanolamine, triethylamine, tripropylamine and tributylamine, are particularly preferably used as neutralization agents.

The neutralizing agent is added in amounts such that the pH of the composition (Z2) is in the range of pH 6 to 8 (at 25° C.).

The composition (Z2) can further comprise at least one UV absorber. Suitable UV absorbers are UV absorbers of the benzotriazole type and/or triazine type. These are commercially available under the following names: Tinuvin® 384 from Ciba Geigy, light stabilizer based on isooctyl 3-(3-(2H-benzotriazol-2-yl)-5-tert-butyl-4-hydroxyphenylpropionate, average molecular weight 451.6, Tinuvin® 1130 from Ciba Geigy, light stabilizer based on the reaction product of polyethylene glycol 300 and methyl 3-[3-(2H-benzotriazol-2-yl)-5-tert-butyl-4-hydroxyphenyl]propionate, average molecular weight >600, CYAGARD® UV-1164L from Dyno Cytec, light stabilizer based on 2,4-bis(2,4-dimethylphenyl)-6-(2-hydroxy-4-isooctylphenyl)-1,3,5-triazine, average molecular weight 510, 65% strength in xylene, Tinuvin® 400 from Ciba Geigy, light stabilizer based on a mixture of 2-[4-((2-hydroxy-3-dodecyloxypropyl)oxy)-2-hydroxyphenyl]-4,6-bis(2,4-dimethylphenyl)-1,3,5-triazine and 2-[4-((2-hydroxy-3-tridecyloxypropyl)oxy)-2-hydroxyphenyl]-4,6-bis(2,4-dimethyl-phenyl)-1,3,5-triazine, average molecular weight 654, 85% in 1-methoxy-2-propanol, CGL 1545 from Ciba Geigy, light stabilizer based on 2-[4-((2-hydroxy-3-octyloxypropyl)oxy)-2-hydroxyphenyl]-4,6-bis(2,4-dimethylphenyl)-1,3,5-triazine, average molecular weight 583, CYAGARD® UV-3801 from Dyno Cytec, immobilizable light stabilizer based on triazine, average molecular weight 498, CYAGARD® UV-3925 from Dyno Cytec, immobilizable light stabilizer based on triazine, average molecular weight 541.

Further suitable UV absorbers are based on sterically hindered amines (HALS) in which the amino function is ether substituted (denoted as amino ether functionalized). Particularly suitable are amino ether functionalized, substituted piperidine derivatives, such as, for example, amino ether functionalized 2,2,6,6-tetramethylpiperidine derivatives. Examples of products are those obtainable commercially under the following names: Tinuvin® 123 from Ciba Geigy, light stabilizer based on bis(1-octyloxy-2,2,6,6-tetramethyl-4-piperidyl)sebacate (average molecular weight 737, pKb 9.6).

Further suitable UV absorbers are amino ether functionalized, substituted piperidine derivatives, such as for example amino ether functionalized 2,2,6,6-tetramethylpiperidine derivatives which contain per molecule at least one group which is reactive with respect to the crosslinking agent, in particular at least one OH group.

The total proportion of the at least one UV absorber is preferably 0.1 to 10% by weight, more preferably 0.5 to 8% by weight, very preferably 1 to 3% by weight, based in each case on the total weight of the composition (Z2).

The composition (Z2) may additionally comprise further additives such as nanoparticles or reactive diluents which are curable thermally or with actinic radiation, free-radical scavengers, thermolabile free-radical initiators, photoinitiators and photocoinitiators, devolatilizers, slip additives, polymerization inhibitors, defoamers, emulsifiers, wetting agents, dispersants, adhesion promoters, leveling agents, film forming auxiliaries, flame retardants, siccatives, dryers, antiskinning agents, corrosion inhibitors, waxes and or flatting agents and mixtures thereof.

The composition (Z2) used in step (4) of the inventive process preferably has a viscosity of 50 to 200 mPa*s, preferably of 60 to 180 mPa*s, more preferably 70 to 150 mPa*s, very preferably 90 to 115 mPa*s, measured at a shear rate of 1000 $s^{-1}$ and 25° C. using a Rheolab QC der Firma Anton Paar. This viscosity allows to apply the composition (Z2) by application gear, preferably spray or pneumatic application, generally used in the automotive industry or in repair body shops.

Process as claimed in any of the proceeding claims, wherein the composition (Z2) has a solids content of 10 to 40% by weight, preferably 15 to 35% by weight, very preferably 18 to 28% by weight, based on the total weight of the composition (Z2) in each case.

The composition (Z2) is preferably applied in step (4) of the inventive process such that the cured coating composition has a rather thin layer thickness. Favorably, the cured coating layer (L3) has a film thickness of 2 to 15 μm, preferably 4 to 12 μm, very preferably 6 to 8 μm.

The composition (Z2) is applied by the methods known to the skilled person for applying liquid coating materials, as for example by dipping, knifecoating, spraying, rolling, or the like. Preference is given to employing spray application methods, such as, for example, compressed air spraying (pneumatic application), and electrostatic spray application (ESTA).

The composition (Z2) or the corresponding coating layer (L3) is subjected to flashing and/or interim-drying after application, preferably at 15 to 35° C. for a duration of 0.5 to 30 minutes.

Step (5):

In step (5) of the process of the invention a clearcoat composition (c2) is directly applied to the coating layer (L3) to form a clearcoat layer (C2). Direct application of the clear coat composition (c2) on the uncured coating layer (L3) results in direct contact of the clear coat layer (C2) and the coating layer (L3). Thus, there is no other coat present between layers (C2) and (L3).

The clearcoat composition (c2) may by the same or may be different from the clearcoat composition (c1) used in step (3) of the inventive process and may be any desired transparent coating material known in this sense to the skilled person. “Transparent” means that a film formed with the coating material is not opaquely colored, but instead has a constitution such that the color of the underlying basecoat system is visible. As is known, however, this does not rule out the possible inclusion, in minor amounts, of pigments in a clearcoat material, such pigments possibly supporting the depth of color of the overall system, for example.

The clearcoat compositions in question are aqueous or solvent-containing transparent coating materials, which may be formulated not only as one-component but also as two-component or multicomponent coating materials. Also suitable, furthermore, are powder slurry clearcoat materials. Solvent-borne clearcoat materials are preferred.

The clearcoat compositions (c2) used may in particular be thermochemically curable and/or actinic-chemically curable. In particular they are thermochemically curable and externally crosslinking. Preference is given to thermochemically curable two-component clearcoat materials.

Typically and preferably, therefore, the clearcoat compositions comprise at least one (first) polymer as binder, having functional groups, and at least one crosslinker having a functionality complementary to the functional groups of the binder. With preference at least one hydroxy-functional poly(meth)acrylate polymer is used as binder, and a free polyisocyanate as crosslinking agent. Suitable clearcoat materials are described in, for example, WO 2006042585 A1, WO 2009077182 A1, or else WO 2008074490 A1.

The clearcoat compositions (c2) is applied by the methods known to the skilled person for applying liquid coating materials, as for example by dipping, knifecoating, spraying, rolling, or the like. Preference is given to employing spray application methods, such as, for example, compressed air spraying (pneumatic application), and electrostatic spray application (ESTA).

The clearcoat composition (c2) or the corresponding clearcoat layer (C2) is subjected to flashing and/or interim-drying after application, preferably at 15 to 35° C. for a duration of 0.5 to 30 minutes. These flashing and interim-drying conditions apply in particular to the preferred case where the clearcoat composition (c2) comprises a thermochemically curable two-component coating material. But this does not rule out the clearcoat composition (c2) being an otherwise-curable coating material and/or other flashing and/or interim-drying conditions being used.

Step (6):

After flashing and/or interim-drying of the clearcoat composition (c2) applied in step (5) of the inventive process, this layer is cured jointly with all layers applied in steps (2) to (5) of the inventive process. Curing is preferably performed at a temperature of 60 to 160° C. for a duration of 5 to 60 minutes. After curing, the clearcoat layer (C2) preferably has a film thickness of 15 to 80 μm, more preferably 20 to 65 μm, very preferably 25 to 60 μm.

In the process of the invention, of course, there is no exclusion of further coating materials, as for example further clearcoat materials, being applied after the application of the clearcoat material (C2), and of further coating films, as for example further clearcoat films, being produced in this way. Such further coating films are then likewise cured in the this. Preferably, however, only one clearcoat material (C2) is applied, and is then cured as previously described. Moreover, the process of the invention allows to produce multilayer coatings on substrates having a visually appealing effect, especially a visually appealing sparkling effect, added to the underlying basecoat. Moreover, a color mixing can be achieved by using the inventive process. Thus, the inventive process provides multilayer coatings in a wide variability in terms of shade and appearance using already existing basecoat colors.

The multilayer coatings produced by the inventive process do not only exhibit excellent appearance but also excellent mechanical stability.

Multilayer Coating (MC):

The result after the end of step (6) of the process of the invention is a multilayer coating (MC) of the invention.

A second subject matter of the present invention is therefore a multilayer coating (MC), produced by the inventive process.

Preferably, the overall thickness of the multilayer coating is kept as low as possible whilst at the same time meeting the high quality and durability requirements of the automotive industry. Thus, the multilayer coating preferably has a total film thickness of 40 to 400 μm, more preferably 100 to 350 μm, very preferably 150 to 300 μm.

What has been said about the inventive process applies mutatis mutandis with respect to further preferred embodiments of the multilayer coating.

The invention is described in particular by the following embodiments: According to a first embodiment, the present invention relates to a process for producing a multilayer coating (MC) on a substrate (S), the process comprising:

(1) optionally applying a composition (Z1) to the substrate (S) and subsequent curing of the composition (Z1) to form a cured first coating layer (S1) on the substrate (S);

(2) applying, directly to the cured first coating layer (S1) or the substrate (S), (a) an aqueous basecoat composition (bL2a) to form a basecoat layer (BL2a) or (b) at least two aqueous basecoat compositions (bL2-a) and (bL2-z) in direct sequence to form at least two basecoat layers (BL2-a) and (BL2-z) directly upon each other;

(3) optionally, applying a clearcoat composition (c1) directly to the basecoat layer (BL2a) or the top basecoat layer (BL2-z) to form a clearcoat layer (C1) and jointly curing the basecoat layer (BL2a) or the at least two basecoat layers (BL2-a) and (BL2-z) and the clearcoat layer (C1), (4) applying a composition (Z2) directly to the basecoat layer (BL2a) or the uppermost basecoat layer (BL2-z) or the clearcoat layer (C1) to form a coating layer (L3)

(5) applying a clearcoat composition (c2) directly to the coating layer (L3) to form a clearcoat layer (C2), (6) jointly curing (a) the basecoat layer (BL2a) or the at least two basecoat layers (BL2-a) and (BL2-z), optionally the clearcoat layer (C1), the coating layer (L3) and the clearcoat layer (C2), or (b) the coating layer (L3) and the clearcoat layer (02), characterized in that the composition (Z2) comprises:

(i) at least one binder B, (ii) at least one solvent L, (iii) at least one platelet glass flake pigment GF1 having an average particle size $D_{90}$ of 30 to 54 μm, measured by means of laser diffraction according to DIN EN ISO 13320:2009-10, and (iv) at least one platelet glass flake pigment GF2 having an average particle size $D_{90}$ of 55 to 80 μm, measured by means of laser diffraction according to DIN EN ISO 13320:2009-10.

According to a second embodiment, the present invention relates to a process according to embodiment 1, wherein the substrate (S) is selected from metallic substrates, plastic substrates, reinforced plastic substrates and substrates comprising metallic and plastic parts, preferably metallic substrates and/or reinforced plastic substrates.

According to a third embodiment, the present invention relates to a process according to embodiment 2, wherein the metallic substrate (S) is selected from iron, aluminum, copper, zinc, magnesium and alloys thereof as well as steel.

According to a fourth embodiment, the present invention relates to a process according to any of the proceeding embodiments, wherein two aqueous basecoat compositions (bL2-a) and (bL2-z) are applied in direct sequence directly to the cured first coating layer (S1) to form two basecoat layers (BL2-a) and (BL2-z) directly upon each other.

According to a fifth embodiment, the present invention relates to a process according to any of the proceeding embodiments, wherein the aqueous basecoat composition (bL2a) or at least one of the aqueous basecoat compositions (bL2-x), preferably all aqueous basecoat compositions (bL2-x), is a one-component or two-component coating composition.

According to a sixth embodiment, the present invention relates to a process according to any of the proceeding embodiments, wherein the aqueous basecoat composition (bL2a) or at least one of the aqueous basecoat compositions (bL2-x), preferably all aqueous basecoat compositions (bL2-x), comprises at least one hydroxy-functional polymer as binder, said at least one hydroxy-functional polymer being selected from the group consisting of a polyurethane, a polyester, a polyacrylate, copolymers thereof and mixtures of these polymers.

According to a seventh embodiment, the present invention relates to a process according to any of the proceeding embodiments, wherein the aqueous basecoat composition (bL2a) or at least one of the aqueous basecoat compositions (bL2-x), preferably all aqueous basecoat compositions (bL2-x), comprise at least one coloring and/or effect pigment.

According to an eighth embodiment, the present invention relates to a process according to embodiment 7, wherein the at least one coloring pigment is selected from the group consisting of (i) white pigments such as titanium dioxide, zinc white, zinc sulfide or lithopone; (ii) black pigments such as carbon black, iron manganese black, or spinel black; (iii) chromatic pigments such as ultramarine green, ultramarine blue, manganese blue, ultramarine violet, manganese violet, red iron oxide, molybdate red, ultramarine red, brown iron oxide, mixed brown, spinel phases and corundum phases, yellow iron oxide, bismuth vanadate; (iv) organic pigments such as monoazo pigments, bisazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, prinone pigments, perylene pigments, phthalocyanine pigments, aniline black; and (v) mixtures thereof.

According to a ninth embodiment, the present invention relates to a process according to embodiments 6 or 7, wherein the at least one effect pigment is selected from the group consisting of (i) platelet-shaped metal effect pigments such as lamellar aluminum pigments, (ii) gold bronzes; (iii) oxidized bronzes and/or iron oxide-aluminum pigments; (iv) pearlescent pigments such as pearl essence; (v) basic lead carbonate; (vi) bismuth oxide chloride and/or metal oxide-mica pigments; (vii) lamellar pigments such as lamellar graphite, lamellar iron oxide; (viii) multilayer effect pigments composed of PVD films; (ix) liquid crystal polymer pigments; and (x) mixtures thereof.

According to a tenth embodiment, the present invention relates to a process according to embodiments 6 to 8, wherein the at least one aqueous basecoat composition (bL2a) or at least one of the aqueous basecoat compositions (bL2-x), preferably all aqueous basecoat compositions (bL2-x), comprise the at least one coloring and/or effect pigment in a total amount of 1 to 40% by weight, preferably 2 to 35% by weight, more preferably 5 to 30% by weight, based on the total weight of the aqueous basecoat composition (bL2a) or (bL2-x) in each case.

According to an eleventh embodiment, the present invention relates to a process according to any of the proceeding embodiments, wherein the aqueous basecoat composition (bL2a) or at least one of the aqueous basecoat compositions (bL2-x), preferably all aqueous basecoat compositions (bL2-x), comprises at least one crosslinking agent selected from the group consisting of blocked and/or free polyisocyanates and aminoplast resins.

According to a twelfth embodiment, the present invention relates to a process according to any of the proceeding embodiments, wherein the at least one platelet glass flake pigment GF1 has an average particle size $D_{90}$ of 32 to 52 μm, preferably 33 to 50 μm, more preferably 34 to 48 μm, very preferably 37 to 47 μm, measured by means of laser diffraction according to DIN EN ISO 13320:2009-10 in each case.

According to a thirteenth embodiment, the present invention relates to a process according to any of the proceeding embodiments, wherein the at least one platelet glass flake pigment GF1 has a volume-averaged cumulative undersize distribution curve with the characteristic numbers $D_{10}$, $D_{50}$ and $D_{90}$, said cumulative undersize distribution curve having a span ΔD of 0.6 to 3.0, preferably 0.8 to 2.5, and the span ΔD being calculated in accordance with the following formula (I): $\Delta D=(D_{90}-D_{10})/D_{50}$ (I).

According to a fourteenth embodiment, the present invention relates to a process according to any of the proceeding embodiments, wherein the at least one platelet glass flake pigment GF2 has an average particle size $D_{90}$ of 55 to 78 μm, preferably 55 to 75 μm, more preferably 55 to 70 μm, very preferably 55 to 65 μm, measured by means of laser diffraction according to DIN EN ISO 13320:2009-10 in each case.

According to a fifteenth embodiment, the present invention relates to a process according to any of the proceeding embodiments, wherein the at least one platelet glass flake pigment GF2 has a volume-averaged cumulative undersize distribution curve with the characteristic numbers $D_{10}$, $D_{50}$ and $D_{90}$, said cumulative undersize distribution curve having a span ΔD of 0.6 to 2.7, preferably 0.9 to 2.3, and the span ΔD being calculated in accordance with the following formula (I): $\Delta D=(D_{90}-D_{10})/D_{50}$ (I).

According to a sixteenth embodiment, the present invention relates to a process according to any of the proceeding embodiments, wherein the composition (Z2) comprises a weight ratio of the at least one platelet glass flake pigment GF1 to the at least one platelet glass flake pigment GF2 from 3:1 to 1:3, preferably of 2:1 to 1:2, very preferably of 1:1.

According to a seventeenth embodiment, the present invention relates to a process according to any of the proceeding embodiments, wherein the at least one platelet glass flake pigment GF1 and the at least one platelet glass flake pigment GF2 are each selected from coated glass flake pigments, said coating being selected from the group consisting of titanium dioxide, zinc oxide, tin oxide, iron oxide, silicon oxide, copper, gold, platinum, aluminum, alumina and mixtures thereof, preferably titanium oxide and/or tin oxide.

According to an eighteenth embodiment, the present invention relates to a process according to embodiment 17, wherein the at least one platelet glass flake pigment GF1 and the at least one platelet glass flake pigment GF2 each comprise the coating in a total amount of 5 to 25% by weight, based on the total weight of glass flake pigment GF1 or GF2.

According to a nineteenth embodiment, the present invention relates to a process according to any of the proceeding embodiments, wherein the at least one platelet glass flake pigment GF1 and the at least one platelet glass flake pigment GF2 each have an aspect ratio of 20 to 10,000, preferably 30 to 3,000, very preferably 35 to 1,500.

According to a twentieth embodiment, the present invention relates to a process according to any of the proceeding embodiments, wherein the at least one platelet glass flake pigment GF1 and the at least one platelet glass flake pigment GF2 each have a total thickness of 500 to 2,000 nm, preferably 750 to 2,000 nm.

According to a twenty-first embodiment, the present invention relates to a process according to any of the proceeding embodiments, wherein the composition (Z2) comprises the at least one platelet glass flake pigment GF1 in a total amount of 0.001 to 0.8% by weight, preferably 0.003 to 0.7% by weight, more preferably 0.02 to 0.6% by weight, even more preferably 0.04 to 0.4% by weight, very preferably 0.08 to 0.12% by weight, based on the total weight of the composition (Z2) in each case.

According to a twenty-second embodiment, the present invention relates to a process according to any of the proceeding embodiments, wherein the composition (Z2) comprises the at least one platelet glass flake pigment GF2 in a total amount of 0.001 to 0.8% by weight, preferably 0.003 to 0.7% by weight, more preferably 0.02 to 0.6% by weight, even more preferably 0.04 to 0.4% by weight, very preferably 0.08 to 0.12% by weight, based on the total weight of the composition (Z2) in each case.

According to a twenty-third embodiment, the present invention relates to a process according to any of the proceeding embodiments, wherein the at least one binder B is selected from the group consisting of hydroxy-functional polyurethane polymers, poly(meth)acrylate polymers, acid-functional polyurethane poly(meth)acrylate hybrid polymers and mixtures thereof.

According to a twenty-fourth embodiment, the present invention relates to a process according to embodiment 23, wherein the composition (Z2) comprises a weight ratio of the at least one hydroxy-functional polyurethane polymer to the at least one acid-functional polyurethane poly(meth) acrylate hybrid polymer from 10:1 to 1:2, preferably from 5:1 to 1:1.

According to a twenty-fifth embodiment, the present invention relates to a process according to any of the proceeding embodiments, wherein the composition (Z2) comprises the at least one binder B in a total amount of 5 to 20% by weight solids, preferably 8 to 15% by weight solids, very preferably 8 to 12% by weight solids, based on the total weight of the composition (Z2) in each case.

According to a twenty-sixth embodiment, the present invention relates to a process according to any of the proceeding embodiments, wherein the at least one solvent L is selected from the group consisting of water, ketones, aliphatic and/or aromatic hydrocarbons, glycol ethers, alcohols, esters and mixtures thereof, preferably water.

According to a twenty-seventh embodiment, the present invention relates to a process according to any of the proceeding embodiments, wherein the composition (Z2) comprises the at least one solvent L in a total amount of 40 to 80% by weight, preferably 50 to 75% by weight, very preferably 60 to 70% by weight, based on the total weight of the composition (Z2) in each case According to a twenty-eight embodiment, the present invention relates to a process according to any of the proceeding embodiments, wherein the composition (Z2) further comprises at least one compound selected from the group consisting of catalysts, crosslinking agents, thickening agents, neutralizing agents, UV stabilizers and mixtures thereof.

According to a twenty-ninth embodiment, the present invention relates to a process according to any of the proceeding embodiments, wherein the composition (Z2) has a viscosity of 50 to 200 mPa*s, preferably of 60 to 180 mPa*s, more preferably 70 to 150 mPa*s, very preferably 90 to 115 mPa*s, measured at a shear rate of 1000 $s^{-1}$ and 25° C. using a Rheolab QC der Firma Anton Paar.

According to a thirtieth embodiment, the present invention relates to a process according to any of the proceeding embodiments, wherein the composition (Z2) has a solids content of 10 to 40% by weight, preferably 15 to 35% by weight, very preferably 18 to 28% by weight, based on the total weight of the composition (Z2) in each case.

According to a thirty-first embodiment, the present invention relates to a process according to any of the proceeding embodiments, wherein the cured coating layer (L3) has a film thickness of 2 to 15 μm, preferably 4 to 12 μm, very preferably 6 to 8 μm.

According to a thirty-second embodiment, the present invention relates to a process according to any of the proceeding embodiments, wherein the joint curing in step (3) and/or (6) is performed at a temperature of 60 to 160° C. for a duration of 5 to 60 minutes.

According to a thirty-third embodiment, the present invention relates to a multilayer coating (MC) produced by the process of any of embodiments 1 to 32.

According to a thirty-fourth embodiment, the present invention relates to a multilayer coating according to embodiment 33, wherein the multilayer coating has a total film thickness of 40 to 250 μm, preferably 50 to 200 μm, very preferably 75 to 170 μm.

EXAMPLES

The present invention will now be explained in greater detail through the use of working examples, but the present invention is in no way limited to these working examples. Moreover, the terms "parts", "%" and "ratio" in the examples denote "parts by mass", "mass %" and "mass ratio" respectively unless otherwise indicated.

1. Methods of Determination:

1.1 Solids Content (Solids, Nonvolatile Fraction)

Unless otherwise indicated, the solids content, also referred to as solid fraction hereinafter, was determined in accordance with DIN EN ISO 3251:2018-07 at 130° C., 60 min, initial mass 1.0 g.

1.2 Hydroxyl Number

The hydroxyl number was determined on the basis of R.-P. Kruger, R. Gnauck and R. Algeier, Plaste and Kautschuk, 20, 274 (1982), by means of acetic anhydride in the presence of 4-dimethylaminopyridine as a catalyst in a tetrahydrofuran (THF)/dimethylformamide (DMF) solution at room temperature, by fully hydrolyzing the excess of acetic anhydride remaining after acetylation and conducting a potentiometric back-titration of the acetic acid with alcoholic potassium hydroxide solution. Acetylation times of 60 minutes were sufficient in all cases to guarantee complete conversion.

1.3 Acid Number

The acid number was determined on the basis of DIN EN ISO 2114:2002-06 in homogeneous solution of tetrahydrofuran (THF)/water (9 parts by volume of THF and 1 part by volume of distilled water) with ethanolic potassium hydroxide solution.

1.4 Degree of Neutralization

The degree of neutralization of a component was calculated from the amount of substance of the carboxylic acid groups present in the component (determined via the acid number) and the amount of substance of the neutralizing agent used.

1.5 Average Particle Size

The average particle size is the volume average particle size which is measured according to DIN EN ISO 13320:2009-10 using laser diffraction.

1.6 Dry Film Thickness

Determination of film thickness was done according to DIN EN ISO 2808:2007-05, procedure 12A by using the test apparatus MiniTest® 3100-4100 from ElektroPhysik.

1.7 Production of Multilayer Coatings

Test panels of galvanized rolled steel were coated with a cathodic electrodeposition coat (CathoGuard® CG 800, BASF Coatings GmbH) and cured at 180° C. for 22 minutes. A commercial filler (available from Hemmelrath Lackfabrik GmbH) was applied and cured at 165° C. for 15 minutes (dry film thickness: 20 to 45 μm).

Test panels were then coated either with basecoat composition BC1 or BC2 (see points 2.2 and 2.3) and dried for 10 minutes at 80° C. (dry film thickness: 10 to 15 μm). Then, a commercially available clear coat composition C1 (Progloss 0365, BASF Coatings GmbH) was applied and dried for 10 minutes at 23° C. (dry film thickness: 30 to 50 μm). The basecoat composition BC1 or BC2 and the clearcoat composition C1 were cured at a 140° C. for 20 minutes. Afterwards, the below listed respective composition Z2 (see point 2.4) was applied and dried for 10 minutes at 80° C. (dry film thickness: 6 to 10 μm). Finally, a commercially available clear coat composition C1 (Progloss 0365, BASF Coatings GmbH) was again applied and dried for 10 minutes at 23° C. (dry film thickness: 30 to 50 μm). Test panels were then subjected to a temperature of 140° C. for 20 minutes to cure the layer prepared with the respective composition Z2 and the outermost clear coat layer.

1.8 Sparkling Test

The sparkling test was carried out to determine the sparkling intensity (Si) and sparkling area (Sa) in three different angles, i.e. at 15°, at 45° and at 75° with a Byk-mac® testing device of BYK-Gardner® GmbH which is based on camera analysis. Sparkling intensity (Si) is a measure of how strong is the light flash of the effect pigment. A total sparkle grade (Si/Sa) is then determined as a function of sparkle intensity and sparkle area.

2. Preparation of Aqueous Basecoat Compositions BC1 and BC2 as well as of Compositions Z2

The following should be taken into account regarding the formulation constituents and amounts thereof as indicted in the tables hereinafter. When reference is made to a commercial product or to a preparation protocol described elsewhere, the reference, independently of the principal designation selected for the constituent in question, is to precisely this commercial product or precisely the product prepared with the referenced protocol.

Accordingly, where a formulation constituent possesses the principal designation "melamine-formaldehyde resin" and where a commercial product is indicated for this constituent, the melamine-formaldehyde resin is used in the form of precisely this commercial product. Any further constituents present in the commercial product, such as solvents, must therefore be taken into account if conclusions are to be drawn about the amount of the active substance (of the melamine-formaldehyde resin).

If, therefore, reference is made to a preparation protocol for a formulation constituent, and if such preparation results, for example, in a polymer dispersion having a defined solids content, then precisely this dispersion is used. The overriding factor is not whether the principal designation that has been selected is the term "polymer dispersion" or merely the active substance, for example, "polymer", "polyester", or "polyurethane-modified polyacrylate". This must be taken into account if conclusions are to be drawn concerning the amount of the active substance (of the polymer).

All proportions indicated in the tables are parts by weight.

2.1 Preparation of Filler and Color Pastes 2.1.1 White Paste P1

The white paste P1 is prepared from 50 parts by weight of titanium rutile 2310, 6 parts by weight of a polyester prepared as per example D, column 16, lines 37-59 of DE 40 09 858 Al, 24.7 parts by weight of a binder dispersion prepared as per patent application EP 022 8003 B2, page 8, lines 6 to 18, 10.5 parts by weight of deionized water, 4 parts by weight of 2,4,7,9-tetramethyl-5-decynediol, 52% in BG (available from BASE SE), 4.1 parts by weight of butyl glycol, 0.4 part by weight of 10% strength dimethylethanolamine in water, and 0.3 part by weight of Acrysol RM-8 (available from The Dow Chemical Company).

2.1.2 Yellow Paste P2

The yellow paste P2 is prepared from 37 parts by weight of Bayferrox 3910 (available from Lanxess), 49.5 parts by weight of an aqueous binder dispersion prepared as per WO 91/15528, page 23, line 26 to page 25, line 24, 7.5 parts by weight of Disperbyk®-184 (available from BYK-Chemie GmbH), and 6 parts by weight of deionized water.

2.1.3 Yellow Paste P3

The yellow paste P3 is prepared from 38 parts by weight of DCC Yellow 2GTA (available from Dominion Colour Corporation), 55 parts by weight of an aqueous binder dispersion prepared as per WO 91/15528, page 23, line 26 to page 25, line 24, 2 parts by weight of Pluriol P 900 C (available from BASF SE), and 5 parts by weight of deionized water.

2.1.4 Black Paste P4

The black paste P4 is obtained by initially introducing 58.9 parts by weight of a polyurethane dispersion prepared as per EP-B-787 159, page 8, polyurethane dispersion B and 5 parts by weight of a polyester dispersion prepared as per EP-B-787 159, page 8, polyester resin solution A, and adding, with rapid stirring, 2.2 parts by weight Pluriol P 900 C (available from BASF SE), 7.6 parts by weight butyl diglycol, 10.1 parts by weight Russ FW2 carbon black pigment (available from Orion Engineered Carbon), 8.4 parts by weight of deionized water, and 3.8 parts by weight of dimethylethanolamine (10% in water). The stirring time amounts to one hour. After stirring, the mixture is ground with a commercially customary laboratory mill until the fineness, measured according to Hegman, is <12 μm. To conclude, the formulation is adjusted to a pH of 7.8-8.2 using 4 parts by weight of dimethylethanolamine (10% in water).

2.1.5 Blue Paste P5

The blue paste P5 is obtained by initially introducing 66.5 parts by weight of a polyurethane dispersion prepared as per EP-B-787 159, page 8, polyurethane dispersion B, and adding, with rapid stirring, 1.7 parts by weight of Pluriol P 900 C (available from BASF SE), 12.5 parts by weight of Paliogenblau L 6482 pigment (available from BASF Dispersions & Pigments Asia Pacific), 14.7 parts by weight of deionized water, and 1.2 parts by weight of dimethylethanolamine (10% in water). The stirring time amounts to one hour. After stirring, the mixture is ground with a commercially customary laboratory mill until the fineness, measured according to Hegman, is <12 μm. To conclude, the formulation is adjusted to a pH of 7.8-8.2 using 0.6 parts by weight of dimethylethanolamine (10% in water).

2.1.6 Blue Paste P6

The blue paste P6 is prepared from 47 parts by weight of Heucodur-Blau 550 (available from Heubach GmbH), 47 parts by weight of a polyurethane dispersion prepared as per EP-B-787 159, page 8, polyurethane dispersion B, 4 parts by weight of Disperbyk®-184 (available from BYK-Chemie GmbH), 3 parts by weight of Pluriol P 900 C (available from BASF SE), 0.3 parts by weight of Agitan 281 (available from Munzing Chemie) and 12.7 parts by of deionized water.

2.1.7 White Paste P7

The white paste P7 is prepared from 50 parts by weight of titanium rutile R-960-38, 11 parts by weight of a polyester prepared as per example D, column 16, lines 37-59 of DE 40 09 858 A1, 16 parts by weight of a binder dispersion prepared as per international patent application WO 92/15405, page 15, lines 23-28, 16.5 parts by weight of deionized water, 3 parts by weight of butyl glycol, 1.5 parts by weight of 10% strength dimethylethanolamine in water, and 1.5 parts by weight of Pluriol® P900 (available from BASF SE).

2.1.9 Preparation of Barium Sulfate Paste P8

The barium sulfate paste P8 is prepared from 54.00 parts by weight of barium sulfate (Blanc Fixe Micro, available from Sachtleben Chemie), 0.3 part by weight of defoamer (Agitan 282, available from Munzing Chemie), 4.6 parts by weight of 2-butoxyethanol, 5.7 parts by weight of deionized water, 3 parts by weight of a polyester (prepared as per example D, column 16, lines 37-59 of DE A 4009858), and 32.4 parts by weight of a polyurethane, by expert grinding and subsequent homogenization.

2.2 Preparation of Aqueous Basecoat Compositions BC1 and BC2

2.2.1 Aqueous Basecoat Composition BC1

Components 2 and 3 were mixed and added to component 1 under stirring. Stirring was continued for 5 minutes and then, components 4 to 19 were added under stirring. to prepare mixture M. Components 20 to 23 were mixed and then added to mixture M while stirring. Finally, components 24 and 25 were added under stirring.

TABLE 1

Aqueous basecoat composition BC1

| | Ingredients | % by wt. |
|---|---|---|
| 1 | Thickening agent [1)] | 11 |
| 2 | Water | 5.1 |
| 3 | Daotan TW 6464/36 WA (supplied by Allnex) | 3.6 |
| 4 | Luwipal 052 (supplied by BASF SE) | 5.6 |
| 5 | Butylglycol | 4.2 |
| 6 | Aqueous dispersion of a polyester [2)] | 3.6 |
| 7 | N-Butoxypropanol | 2.2 |
| 8 | 2,4,7,9-tetramethy1-5-decynediol, 52% in BG (supplied by BASF SE) | 1.2 |
| 9 | Dimethylethanolamine | 0.61 |
| 10 | Water | 11 |
| 11 | Daotan TW 6464/36 WA (supplied by Allnex) | 3.0 |

TABLE 1-continued

| Aqueous basecoat composition BC1 | | |
|---|---|---|
| | Ingredients | % by wt. |
| 12 | Polyurethane poly methacrylate hybrid polymer dispersion [3)] | 2.5 |
| 13 | Pluriol P 900 C (supplied by BASF SE) | 1.4 |
| 14 | N-Ethoxypropanol | 2.8 |
| 15 | Water | 8.1 |
| 16 | Daotan TW 6464/36 WA (supplied by Allnex) | 4.6 |
| 17 | PU thickener (PU 1250 supplied by BASF SE) | 0.90 |
| 18 | Water | 8.0 |
| 19 | Isopar L (supplied by Exxon Mobile Chemical) | 0.80 |
| 20 | White paste P1 | 6.2 |
| 21 | Yellow paste P2 | 0.28 |
| 22 | Yellow paste P3 | 0.30 |
| 23 | Black paste P4 | 1.65 |
| 24 | Triisobutylphosphate | 1.0 |
| 25 | Water | 6.06 |

[1)] contains 93% by wt. water, 0.1% by wt. Acticide MBR, 3% by wt. Laponite ® RD and 3% by wt. Pluriol P 900 C
[2)] Aqueous dispersion prepared as per example D, column 16, lines 37-59 of DE A 4009858, solids content = 60%
[3)] Aqueous dispersion prepared as per US 2012/100394 A1, paragraph [0146] (Preparation Example 3), solids content = 35.5%

2.2.2 Aqueous Basecoat Composition BC2

Components 2 and 3 were mixed and stirred for 5 minutes before component 4 was added. The obtained mixture was and added to component 1 under stirring to obtain mixture M1. Then, components 5 and 6 were mixed and stirred for 5 minutes before being added to mixture Ml. Afterwards, components 7 to 21 were added under stirring to prepare mixture M2. Components 22 to 25 were added to a separate mixing vessel, mixed and added to mixture M2 under stirring. The mixing vessel was rinsed with component 26 and the rinse was also added to mixture M2 to prepare mixture M3. Then, components 24 and 25 were added under stirring. Component 27 was charged in a separate mixing vessel, components 28 to 30 were added and dispersed for 30 minutes. Afterwards, the dispersion was added to mixture M3 while stirring. Finally, components 31 to 33 were added while stirring.

TABLE 2

| Aqueous basecoat composition BC2 | | |
|---|---|---|
| | Ingredients | % by wt. |
| 1 | Thickening agent [1)] | 17 |
| 2 | Water | 2.0 |
| 3 | Polyurethane poly methacrylate hybrid polymer dispersion [2)] | 3.5 |
| 4 | 2,4,7,9-tetramethy1-5-decynediol, 52% in BG (supplied by BASF SE) | 0.30 |
| 5 | Water | 5.0 |
| 6 | PU thickener (PU 1250 supplied by BASF SE) | 0.15 |
| 7 | Butylglycol | 7.9 |
| 8 | Aqueous dispersion of a polyester [3)] | 3.4 |
| 9 | 2,4,7,9-tetramethy1-5-decynediol, 52% in BG (supplied by BASF SE) | 0.30 |
| 10 | Luwipal 052 (supplied by BASF SE) | 4.4 |
| 11 | Dimethylethanolamine | 0.4 |
| 12 | Pluriol P 900 C (supplied by BASF SE) | 1.1 |
| 13 | Water | 3.0 |
| 14 | Polyurethane poly methacrylate hybrid polymer dispersion [4)] | 20 |
| 15 | 2,4,7,9-tetramethy1-5-decynediol, 52% in BG (supplied by BASF SE) | 0.30 |
| 16 | Dimethylethanolamine | 0.40 |
| 17 | PAc thickener (AS S130 supplied by BASF SE) | 2.9 |
| 18 | Water | 2.0 |
| 19 | Butanol | 1.0 |
| 20 | Isopar L (supplied by Exxon Mobile Chemical) | 1.0 |
| 21 | Butyldiglycol | 1.0 |

TABLE 2-continued

| Aqueous basecoat composition BC2 | | |
|---|---|---|
| | Ingredients | % by wt. |
| 22 | Black paste P4 | 2.1 |
| 23 | Blue paste P5 | 2.4 |
| 24 | Blue paste P6 | 0.38 |
| 25 | White paste P7 | 0.090 |
| 26 | Water | 1.0 |
| 27 | Mixing lacquer [5)] | 7.95 |
| 28 | Mearlin Ext. Fine Pearl 139 V (supplied by BASF Dispersions & Pigments Asia Pacific) | 1.6 |
| 29 | Mearlin Ext. Fine Blue 639 V (supplied by BASF Dispersions & Pigments Asia Pacific) | 0.57 |
| 30 | Mearlin Ext. Blue Green 7289 Z (supplied by BASF Dispersions & Pigments Asia Pacific) | 0.48 |
| 31 | Barium sulfate paste P8 | 1.9 |
| 32 | Water | 4.48 |
| 33 | Triisobutylphosphate | 1.0 |

[1)] contains 93% by wt. water, 0.1% by wt. Acticide MBR, 3% by wt. Laponite ® RD and 3% by wt. Pluriol P 900 C
[2)] Aqueous dispersion is prepared according to US 2012/100394 A1, paragraph [0146] (Preparation Example 3), solids content = 35.5%
[3)] Aqueous dispersion is prepared according to example D, column 16, lines 37-59 of DE A 4009858, solids content = 60%
[4)] Aqueous dispersion is prepared according to U.S. Pat. No. 6,632,915 B, Example 2, solids content = 35.1%
[5)] contains 81% by wt. water, 2.7% by wt. Rheovis AS S130, 8.9% by wt. TMDD BG 52, 3.2% by wt. Dispex ultra FA 4437 and 3.3% by wt. dimethylethanolamine

2.3 Preparation of Compositions Z2

The respective compositions Z2-1 to Z2-6 were prepared by mixing the components listed in Table 3.

TABLE 3

| Compositions (Z2-1) to (Z2-6) (amounts in % by wt.) | | | | | | |
|---|---|---|---|---|---|---|
| Ingredients | Z2-1 | Z2-2 | Z2-3 | Z2-4 | Z2-5 | Z2-6 |
| Thickening agent [1)] | 23 | 23 | 23 | 23 | 23 | 23 |
| 2,4,7,9-tetramethy1-5-decynediol, 52% in BG (supplied by BASF SE) | 1.7 | 1.7 | 1.7 | 1.7 | 1.7 | 1.7 |
| Hydroxy-functional polyurethane polymer dispersion [1)] | 31.6 | 31.6 | 31.6 | 31.6 | 31.6 | 31.6 |
| Polyurethane poly methacrylate hybrid polymer dispersion [2)] | 3.5 | 3.5 | 3.5 | 3.5 | 3.5 | 3.5 |
| Butylglycol | 3.2 | 3.2 | 3.2 | 3.2 | 3.2 | 3.2 |
| Cymel 1133 100% (supplied by Allnex) | 6.4 | 6.4 | 6.4 | 6.4 | 6.4 | 6.4 |
| Neutralizing agent (DMEA) | 1.4 | 1.4 | 1.4 | 1.4 | 1.4 | 1.4 |
| Rheovis AS S130 (supplied by BASF SE) | 6.3 | 6.3 | 6.3 | 6.3 | 6.3 | 6.3 |
| Rheovis PU1250 (supplied by BASF SE) | 0.3 | 0.3 | 0.3 | 0.3 | 0.3 | 0.3 |
| Pluriol P 900 C (supplied by BASF SE) | 0.5 | 0.5 | 0.5 | 0.5 | 0.5 | 0.5 |
| 2-Ethylhexanol | 2.5 | 2.5 | 2.5 | 2.5 | 2.5 | 2.5 |
| Triisobutylphosphat | 1.5 | 1.5 | 1.5 | 1.5 | 1.5 | 1.5 |
| Tinuvin 1130 (supplied by BASF SE) | 1.0 | 1.0 | 1.0 | 1.0 | 1.0 | 1.0 |
| Bis(octyloxytetramethyl-piperydyl)-sebacate | 0.5 | 0.5 | 0.5 | 0.5 | 0.5 | 0.5 |
| Catalyst solution PTSA [3)] | 1.0 | 1.0 | 1.0 | 1.0 | 1.0 | 1.0 |
| Daotan TW 6464/36 WA (supplied by Allnex) | 2.0 | 2.0 | 2.0 | 2.0 | 2.0 | 2.0 |

TABLE 3-continued

| Compositions (Z2-1) to (Z2-6) (amounts in % by wt.) | | | | | | |
|---|---|---|---|---|---|---|
| Ingredients | Z2-1 | Z2-2 | Z2-3 | Z2-4 | Z2-5 | Z2-6 |
| Mixing lacquer [6)] | 0.54 | 0.54 | 0.54 | 0.54 | 0.54 | 0.54 |
| Platelet glass flakes GF1 [4)] | 0.1 | 0.1 | 0.3 | 0 | 0 | 0 |
| Platelet glass flakes GF2 [5)] | 0.1 | 0 | 0 | 0.1 | 0.5 | 1 |
| Water | 12.86 | 12.86 | 12.86 | 12.86 | 12.86 | 12.86 |

[1)] contains 93% by wt. water, 0.1% by wt. Acticide MBR, 3% by wt. Laponite ® RD and 3% by wt. Pluriol P 900 C

[1)] Aqueous dispersion is prepared according to page 12, line 40 to page 13, line 6 of EP 0 394 737 B1 (Example 1, Polyurethane Dispersion 1), solids content = 26%

[2)] Aqueous dispersion is prepared according to US 2012/100394 A1, paragraph [0146] (Preparation Example 3), solids content = 35.5%

[3)] contains 44.5% by weight 2-amino-2-methylpropanol-p-toluenesulfonate in a mixture of isopropanol, n-propanol and water

[4)] particle size $D_{10}$ of 5 to 15 μm, $D_{50}$ of 17 to 27 μm, $D_{90}$ of 37 to 47 μm, span ΔD = 1.1 to 1.9, coated with a $SnO_2$—$TiO_2$ layer, amount of layer 11 to 25% by weight (based on total weight of platelet glass flake), supplied by Eckart GmbH & Co. KG

[5)] particle size $D_{10}$ of 10 to 20 μm, $D_{50}$ of 25 to 35 μm, $D_{90}$ of 55 to 65 μm, span ΔD = 1.2 to 1.8, coated with a $SnO_2$—$TiO_2$ layer, amount of layer 11 to 25% by weight (based on total weight of platelet glass flake), supplied by Eckart GmbH & Co. KG

[6)] contains 81% by wt. water, 2.7% by wt. Rheovis AS S130, 8.9% by wt. TMDD BG 52, 3.2% by wt. Dispex ultra FA 4437 and 3.3% by wt. dimethylethanolamine 3. Sparkling Test and Visual Evaluation The test panels described in Table 4 were prepared according to the method described in point 1.7 using the compositions stated in points 2.1 to 2.3:

TABLE 4

| Prepared test panels | | | | |
|---|---|---|---|---|
| No test panel | Base coat | Clear coat | Composition Z2 | Clear coat |
| 1* | BC1 | C1 | Z2-1 | C1 |
| 2 | BC1 | C1 | Z2-2 | C1 |
| 3 | BC1 | C1 | Z2-3 | C1 |
| 4 | BC1 | C1 | Z2-4 | C1 |
| 5 | BC1 | C1 | Z2-5 | C1 |
| 6 | BC1 | C1 | Z2-6 | C1 |
| 7* | BC2 | C1 | Z2-1 | C1 |
| 8 | BC2 | C1 | Z2-2 | C1 |
| 9 | BC2 | C1 | Z2-3 | C1 |
| 10 | BC2 | C1 | Z2-4 | C1 |
| 11 | BC2 | C1 | Z2-5 | C1 |
| 12 | BC2 | C1 | Z2-6 | C1 |

*inventive multilayer coating

The sparkling effect of these test panels was determined as described in point 1.8. The results are shown in Table 5.

TABLE 5

| Sparkling test results | | | | | | | | | |
|---|---|---|---|---|---|---|---|---|---|
| | Si (sparkling intensity) | | | Sa (sparkling area) | | | Si/Sa (sparkle grade) | | |
| Panel | 15° | 45° | 75° | 15° | 45° | 75° | 15° | 45° | 75° |
| 1* | 17.58 | 8.66 | 6.69 | 23.52 | 27.52 | 22.17 | 0.75 | 0.31 | 0.30 |
| 2 | 13.13 | 7.62 | 7.09 | 26.67 | 29.93 | 20.94 | 0.49 | 0.25 | 0.34 |
| 3 | 21.14 | 9.20 | 7.50 | 23.29 | 26.86 | 20.29 | 0.91 | 0.34 | 0.28 |
| 4 | 14.16 | 8.43 | 7.01 | 25.17 | 29.28 | 23.16 | 0.56 | 0.29 | 0.30 |
| 5 | 56.67 | 18.40 | 7.65 | 19.69 | 19.43 | 21.58 | 2.88 | 0.95 | 0.35 |
| 6 | 65.66 | 19.50 | 16.55 | 23.05 | 17.93 | 16.73 | 2.84 | 1.09 | 0.99 |
| 7* | 38.69 | 3.57 | 1.85 | 13.71 | 3.05 | 0.89 | 2.82 | 1.17 | 2.08 |
| 8 | 21.02 | 5.47 | 1.30 | 11.62 | 2.34 | 0.29 | 1.81 | 2.33 | 4.48 |
| 9 | 29.49 | 7.11 | 2.16 | 18.73 | 4.17 | 1.22 | 1.57 | 1.71 | 1.77 |
| 10 | 31.41 | 3.04 | 1.51 | 10.94 | 1.88 | 1.61 | 2.87 | 1.62 | 0.94 |
| 11 | 60.08 | 12.35 | 1.97 | 19.32 | 5.59 | 1.40 | 3.11 | 2.21 | 1.41 |
| 12 | 74.52 | 10.47 | 5.79 | 24.45 | 9.02 | 3.66 | 3.05 | 1.16 | 1.58 |

*inventive multilayer coating

Multilayer coatings with a coating layer (L3) comprising only glass flakes GF1 with a $D_{90}$ particle size of 37 to 47 μm in an amount of 0.1% by weight (panels 2 and 8) have lower sparkling intensity, sparkling area and sparkle grade for all angles than the inventive multilayer coatings with a coating layer (L3) comprising a 1:1 mixture of glass flakes with a higher and a lower $D_{90}$ particle size in an amount of 0.2% by weight (panels 1 and 7). Surprisingly, the sparkle grade could not be increased for all angles as compared to the inventive multilayer coatings by increasing the amount of glass flakes GF1 in composition (Z2) to 0.3% by weight (panels 3, 9).

Using only glass flakes GF2 with a higher $D_{90}$ particle size of 55 to 65 μm in an amount of 0.1% by weight in composition (Z2) (panels 4 and 10), the sparkle grade could not be increased for all angles as compared to the multilayer coating with a coating layer (L3) comprising only glass flakes GF1 with smaller $D_{90}$ particle sizes (panels 2 and 8) or the inventive multilayer coating where coating layer (L3) comprises a 1:1 mixture of glass flakes GF1 and GF2 (panels 1 and 7).

Surprisingly, the use of a higher amount of glass flakes GF2 of 0.5% by weight (panels 5 and 11) or 1% by weight (panels 6 and 12) only lead to an increased sparkle grade for all measured angles when BC1 was used (panels 5 and 6) as compared to the inventive multilayer coating (panel 1), while no increased sparkle grade was obtained for all measured angles if BC2 was used (panels 11 and 12) as compared to the inventive multilayer coating (panel 7).

The inventive multilayer coatings where coating layer (L3) comprises a 1:1 mixture of glass flakes with different $D_{90}$ values results in a visually appealing impression while the sparkling effect of multilayer coatings where only glass flakes GF1 or GF2 are incorporated is perceived either as being too low (in case where 0.1% or 0.3 by weight of GF1 or GF2 is present) or as being to intensive (in case where GF1 or GF2 are present in amounts of 0.5 or 1% by weight).

Thus, only the combination of glass flakes having different $D_{90}$ values in the claimed range results in a sparkle grade that is visually appealing while the use of only one sort of glass flakes results in sparkle grades being perceived as too low or too high. The inventive process thus allows to produce multilayer coatings from already existing basecoat colors having a visually appealing impression by adding a sparkling effect to the underlaying base coat, brightening the tone of the base coat layer or adding a differently colored sparkle to the underlaying base coat layer. The inventive process therefore provides a high variability in terms of shade and appearance by using already existing serial base coat colors without the necessity to produce a coating composition for each desired color.

The invention claimed is:

1. A process for producing a multilayer coating (MC) on a substrate(S), the process comprising:

(1) optionally applying a composition (Z1) to the substrate(S) and subsequently curing the composition (Z1) to form a cured first coating layer (S1) on the substrate (S);

(2) applying, directly to the cured first coating layer (S1) or the substrate(S), (*a*) an aqueous basecoat composition (bL2a) to form a basecoat layer (BL2a) or (*b*) at least two aqueous basecoat compositions (bL2-a) and (bL2-z) in direct sequence to form at least two basecoat layers (BL2-a) and (BL2-z) directly upon each other;

(3) applying a clearcoat composition (c1) directly to the basecoat layer (BL2a) or the top basecoat layer (BL2-z) to form a clearcoat layer (C1) and jointly curing the basecoat layer (BL2a) or the at least two basecoat layers (BL2-a) and (BL2-z) and the clearcoat layer (C1);

(4) applying a composition (Z2) directly to the clearcoat layer (C1) to form a coating layer (L3);

(5) applying a clearcoat composition (c2) directly to the coating layer (L3) to form a clearcoat layer (C2); and (6) jointly curing the coating layer (L3) and the clearcoat layer (C2);

wherein the composition (Z2) comprises:

(i) at least one binder B, (ii) at least one solvent L, (iii) at least one platelet glass flake pigment GF1 having an average particle size $D_{90}$ of 30 to 54 μm, measured by means of laser diffraction according to DIN EN ISO 13320:2009-10, and having a span ΔD of 0.6 to 3.0; and (iv) at least one platelet glass flake pigment GF2 having an average particle size $D_{90}$ of 55 to 80 μm, measured by means of laser diffraction according to DIN EN ISO 13320:2009-10, and having a span ΔD of 0.6 to 2.7;

wherein the composition (Z2) comprises a weight ratio of the at least one platelet glass flake pigment GF1 to the at least one platelet glass flake pigment GF2 of 3:1 to 1:3; wherein the at least one platelet glass flake pigment GF1 and the at least one platelet glass flake pigment GF2 are different from each other.

2. The process as claimed in claim 1, wherein the substrate(S) is selected from the group consisting of metallic substrates, plastic substrates and substrates comprising metallic and plastic parts.

3. The process as claimed in claim 1, wherein the at least one platelet glass flake pigment GF1 has an average particle size $D_{90}$ of 32 to 52 μm, measured by means of laser diffraction according to DIN EN ISO 13320:2009-10.

4. The process as claimed in claim 1, wherein the at least one platelet glass flake pigment GF2 has an average particle size $D_{90}$ of 55 to 78 μm, measured by means of laser diffraction according to DIN EN ISO 13320:2009-10.

5. The process as claimed in claim 1, wherein the composition (Z2) comprises a weight ratio of the at least one platelet glass flake pigment GF1 to the at least one platelet glass flake pigment GF2 of 1:1.

6. The process as claimed in claim 1, wherein the at least one platelet glass flake pigment GF1 and the at least one platelet glass flake pigment GF2 are each selected from the group consisting of coated glass flake pigments, said coating being selected from the group consisting of titanium dioxide, zinc oxide, tin oxide, iron oxide, silicon oxide, copper, gold, platinum, aluminum, alumina and mixtures thereof.

7. The process as claimed in claim 1, wherein the at least one platelet glass flake pigment GF1 and the at least one platelet glass flake pigment GF2 each have an aspect ratio of 20 to 10,000.

8. The process as claimed in claim 1, wherein the composition (Z2) comprises the at least one platelet glass flake pigment GF1 in a total amount of 0.001 to 0.8% by weight, based on the total weight of the composition (Z2).

9. The process as claimed in claim 1, wherein the composition (Z2) comprises the at least one platelet glass flake pigment GF2 in a total amount of 0.001 to 0.8% by weight, based on the total weight of the composition (Z2).

10. The process as claimed in claim 1, wherein the at least one binder B is selected from the group consisting of hydroxy-functional polyurethane polymers and/or acid-functional polyurethane poly (meth) acrylate hybrid polymers.

11. The process as claimed in claim 1, wherein the composition (Z2) comprises the at least one binder B in a total amount of 5 to 20% by weight solids, based on the total weight of the composition (Z2).

12. The process as claimed in claim 1, wherein the at least one solvent L is selected from the group consisting of water, ketones, aliphatic and/or aromatic hydrocarbons, glycol ethers, alcohols, esters and mixtures thereof.

13. The process as claimed in claim 1, wherein the composition (Z2) comprises the at least one solvent L in a total amount of 40 to 80% by weight, based on the total weight of the composition (Z2).

14. The process as claimed in claim 1, wherein the cured coating layer (L3) has a film thickness of 2 to 15 μm.

15. The process as claimed in claim 1, wherein the substrate(S) is selected from the group consisting of metallic substrates.

16. The process as claimed in claim 1, wherein the at least one platelet glass flake pigment GF1 has an average particle size $D_{90}$ of 33 to 50 μm, measured by means of laser diffraction according to DIN EN ISO 13320:2009-10.

17. The process as claimed in claim 1, wherein the at least one platelet glass flake pigment GF2 has an average particle size $D_{90}$ of 55 to 75 μm, measured by means of laser diffraction according to DIN EN ISO 13320:2009-10.

18. The process as claimed in claim 1, wherein the composition (Z2) comprises a weight ratio of the at least one platelet glass flake pigment GF1 to the at least one platelet glass flake pigment GF2 from 2:1 to 1:2.

19. The process as claimed in claim 1, wherein the at least one platelet glass flake pigment GF1 and the at least one platelet glass flake pigment GF2 are each selected from the group consisting of titanium oxide and tin oxide.

20. The process as claimed in claim 1, wherein the at least one platelet glass flake pigment GF1 has a particle size $D_{10}$ of 1 to 25 μm and a particle size $D_{50}$ of 10 to 35 μm.

21. The process as claimed in claim 1, wherein the at least one platelet glass flake pigment GF2 has a particle size $D_{10}$ of 5 to 30 μm and a particle size $D_{50}$ of 15 to 45 μm.

* * * * *